(12) United States Patent
Ray et al.

(10) Patent No.: US 12,003,731 B2
(45) Date of Patent: Jun. 4, 2024

(54) ADAPTIVE DETERMINATION OF MULTIPLE TRANSFORM CANDIDATES FOR VIDEO CODING

(71) Applicant: QUALCOMM Incorporated, San Diego, CA (US)

(72) Inventors: Bappaditya Ray, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/933,318

(22) Filed: Sep. 19, 2022

(65) Prior Publication Data

US 2023/0099505 A1     Mar. 30, 2023

Related U.S. Application Data

(60) Provisional application No. 63/255,216, filed on Oct. 13, 2021, provisional application No. 63/249,708, filed on Sep. 29, 2021.

(51) Int. Cl.
    *H04N 19/136*      (2014.01)
    *H04N 19/176*      (2014.01)
     (Continued)

(52) U.S. Cl.
    CPC ......... *H04N 19/136* (2014.11); *H04N 19/176* (2014.11); *H04N 19/18* (2014.11); *H04N 19/60* (2014.11)

(58) Field of Classification Search
CPC .... H04N 19/136; H04N 19/176; H04N 19/18; H04N 19/60; H04N 19/12; H04N 19/13; H04N 19/61
See application file for complete search history.

(56) References Cited

U.S. PATENT DOCUMENTS

2019/0068989 A1   2/2019   Lee
2020/0177901 A1   6/2020   Choi et al.
(Continued)

FOREIGN PATENT DOCUMENTS

CA     3113988 A1 * 3/2020 ........... H04N 19/119
CA     3117933 A1 * 5/2020 ........... H04N 19/105
(Continued)

OTHER PUBLICATIONS

International Search Report and Written Opinion—PCT/US2022/076708—ISA/EPO—dated Feb. 8, 2023, 19 Pages.
(Continued)

*Primary Examiner* — Dramos Kalapodas
(74) *Attorney, Agent, or Firm* — Shumaker & Sieffert, PA

(57) ABSTRACT

An example device for decoding video data includes a memory configured to store video data; and one or more processors implemented in circuitry and configured to: determine a number of multiple transform selection (MTS) candidates for a current block of video data, the number being greater than zero and different than four, the MTS candidates being MTS candidates other than a DCT2 candidate; determine one of the MTS candidates of the number of MTS candidates for the current block; inverse transform a transform block for the current block using the determined one of the MTS candidates to produce a residual block; and decode the current block using the residual block.

29 Claims, 10 Drawing Sheets

(51) Int. Cl.
    H04N 19/18       (2014.01)
    H04N 19/60       (2014.01)

(56) References Cited

U.S. PATENT DOCUMENTS

| | | | |
|---|---|---|---|
| 2021/0211685 A1 | 7/2021 | Egilmez et al. | |
| 2022/0030278 A1 | 1/2022 | Egilmez et al. | |
| 2022/0116608 A1* | 4/2022 | Nam | H04N 19/18 |
| 2022/0150497 A1* | 5/2022 | Nam | H04N 19/70 |

FOREIGN PATENT DOCUMENTS

| | | | |
|---|---|---|---|
| CN | 111263158 A * | 6/2020 | H04N 19/11 |
| EP | 3745722 A1 | 12/2020 | |
| WO | 2020050651 A1 | 3/2020 | |
| WO | WO-2020050651 A1 * | 3/2020 | |
| WO | 2020141159 A2 | 7/2020 | |
| WO | WO-2020141159 A2 * | 7/2020 | H04N 19/102 |

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020, XP030293002, 548 Pages.

Chen J., et al., "Algorithm Description for Versatile Video Coding and Test Model 10 (VTM 10)", 19, JVET Meeting, Jun. 22, 2020-Jul. 1, 2020, Teleconference, (The Joint Video Exploration Team of ISO/IEC JTC1/SC29/WG11 and ITU-T SG.16), No. JVET-S2002-V1, Oct. 10, 2020, XP030302176, pp. 1-97, JVET-S2002-V2.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Partial International Search Report—PCT/US2022/076708—ISA/EPO—Dec. 21, 2022, 11 Pages.

Ray B., et al., "EE2: Enhanced Intra MTS and LFNST (Tests 4.1, 4.2, and 4.4)", JVET-W0103-v4, Joint Video Experts Team (JVET) of ITU-T SG 16 WP 3 and ISO/IEC JTC 1/SC 29, 23rd Meeting, by teleconference, Jul. 7-16, 2021, JVET-W0103-v3 doc, pp. 1-4.

Ray B., et al., "EE2-4.4: Adaptive Intra MTS", JVET-Y0142-v2, Joint Video Experts Team (JVET) of ITU-T SG 16 WP 3 and ISO/IEC JTC 1/SC 29, 25th Meeting, by teleconference, Jan. 12-21, 2022, pp. 1-5.

Ray B., et al., "Non-EE2: Adaptive Intra MTS", JVET-X0135, Joint Video Experts Team (JVET) of ITU-T SG 16 WP 3 and ISO/IEC JTC 1/SC 29, 24th Meeting, by teleconference, JVET-X0135-v2, Oct. 6-16, 2021, pp. 1-4.

Ray (Qualcomm) B., et al., "Enhanced Intra MTS and LFNST for Compression Beyond VVC", JVET-V0116-v3, Joint Video Experts Team (JVET) of ITU-T SG 16 WP 3 and ISO/IEC JTC 1/SC 29, 22nd Meeting, by teleconference, Apr. 20, 2021-Apr. 28, 2021, XP030294292, 7 Pages.

Sole J., et al., "Transform Coefficient Coding in HEVC", 2012 Picture Coding Symposium (PCS 2012), Krakow, Poland, May 7, 2012-May 9, 2012, [Proceedings], IEEE, Piscataway, NJ, May 7, 2012, pp. 461-464, XP032449801.

"Text of ISO/IEC CD 23090-15 Conformance Testing for Versatile Video Coding", 132. MPEG Meeting, Oct. 12, 2020-Oct. 16, 2020, Online, (Motion Picture Expert Group or ISO/IEC JTC1/SC29/WG11), No. n19671, Nov. 5, 2020, XP030291470, 59 Pages.

* cited by examiner

ADAPTIVE DETERMINATION OF MULTIPLE TRANSFORM CANDIDATES FOR VIDEO CODING

This application claims the benefit of U.S. Provisional Application No. 63/249,708, filed Sep. 29, 2021, and of U.S. Provisional Application No. 63/255,216, filed Oct. 13, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptively determining multiple transform selection (MTS) candidates for video coding. Video coding generally includes generating a prediction block for a current block of video data and coding (encoding or decoding) a residual block, representing pixel-by-pixel differences between the prediction block and an uncoded version of the current block. Coding the residual block generally includes transforming the residual block to form a transform block (by an encoder) or inverse transforming the transform block to reproduce the residual block (by a decoder). The transform or inverse transform may be one of a variety of multiple transform selection (MTS) schemes. According to the techniques of this disclosure, a number of transform schemes for the current block may be determined, e.g., according to a number of non-zero transform coefficients of a transform block of the current block, an absolute sum of the non-zero coefficients of the transform block, and/or a position of a last significant (i.e., non-zero) coefficient in the transform block. Using a relatively large number of MTS candidates may allow for a wide array of possible MTS candidates, which may improve transform energy compression, thereby reducing bitrate.

In one example, a method of decoding video data includes determining a number of multiple transform selection (MTS) candidates for a current block of video data, the number being greater than zero and different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

In another example, a device for decoding video data includes a memory configured to store video data; and one or more processors implemented in circuitry and configured to: determine a number of multiple transform selection (MTS) candidates for a current block of video data, the number being greater than zero and different than four, the MTS candidates being MTS candidates other than a DCT2 candidate; determine one of the MTS candidates of the number of MTS candidates for the current block; inverse transform a transform block for the current block using the determined one of the MTS candidates to produce a residual block; and decode the current block using the residual block.

In another example, a device for decoding video data includes means for determining a number of multiple transform selection (MTS) candidates for a current block of video data, the number being greater than zero and different than four, the MTS candidates being MTS candidates other than a DCT2 candidate; means for determining one of the MTS candidates of the number of MTS candidates for the current block; means for inverse transforming a transform block for the current block using the determined one of the MTS candidates to produce a residual block; and means for decoding the current block using the residual block.

The details of one or more examples are set forth in the accompanying drawings and the description below. Other features, objects, and advantages will be apparent from the description, drawings, and claims.

DETAILED DESCRIPTION

Figure 1:
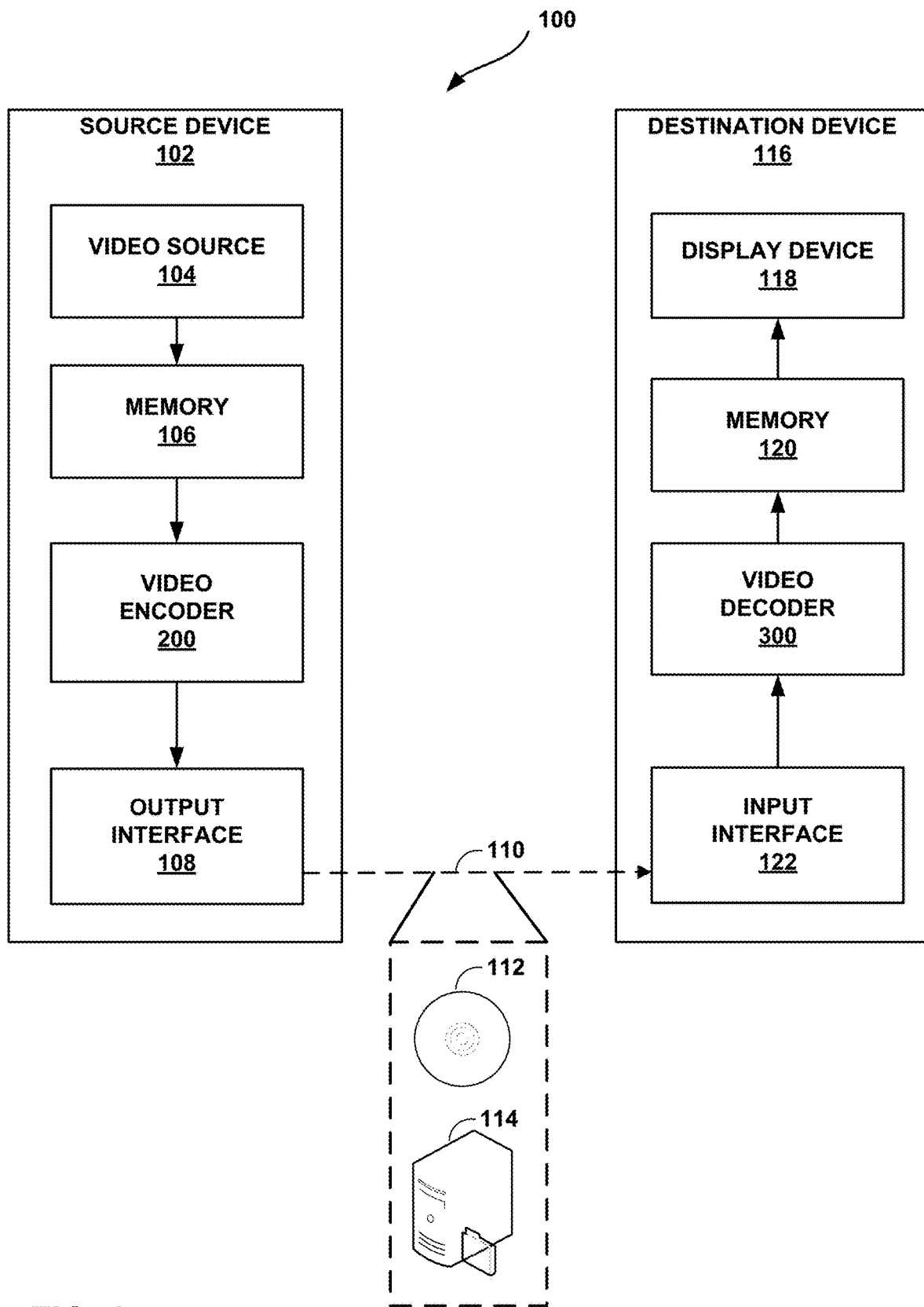
FIG. 1 is a block diagram illustrating an example video encoding and decoding system that may perform the techniques of this disclosure.

In general, this disclosure describes techniques related to transforming and inverse transforming residual blocks of video data. Transforming a residual block of video data includes applying one or more transforms to the residual block to convert residual samples to a frequency domain representation (transform coefficients), which can be inverse transformed using one or more inverse transforms to reproduce the residual samples in a spatial (pixel) domain. In some examples, the transforms or inverse transforms may be selected from a set of multiple transform selection (MTS) candidates. A video coder, such as a video encoder or video decoder, may determine the number of MTS candidates to be included, and which MTS candidates to include, in the set of MTS candidates based on a variety of criteria. In some examples, the video coder may determine the number of MTS candidates to include in the set of MTS candidates according to a number of non-zero transform coefficients of a transform block, an absolute sum of the non-zero coefficients of the transform block, a position of a last non-zero transform coefficient in scan order in the transform block, or the like. Use of these criteria may allow for a variation in the number of MTS candidates, which may reduce the size of an MTS index value coded for the transform block to indicate which of the MTS candidates is to be used to perform the transform or inverse transform. This reduction may in turn reduce the overall bitrate for the bitstream.

Furthermore, allowing for a greater number of MTS candidates may allow for a wider array of possible MTS candidates. A certain MTS candidate included in the wider array of possible MTS candidates may be better in terms of compressing energy in the transform block than other MTS candidates, which would not have been permitted in conventional techniques that restrict the number of MTS candidates to 4. Thus, allowing for a wider array of possible MTS candidates may also reduce the overall bitrate for the bitstream.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions. During the April 2018 meeting of the Joint Video Experts Team (JVET), the Versatile Video Coding (VVC) standardization activity (also known as ITU-T H.266) was initiated by an evaluation of video compression technologies submitted for a Call for Proposals.

In addition to DCT-II which has been employed in HEVC, a Multiple Transform Selection (MTS) scheme may be used, e.g., in VVC, for residual coding of both inter- and intra-coded blocks. According to the MTS scheme, multiple selected transforms from the DCT8/DST7 may be used to transform a residual block or inverse transform a transform block. The newly introduced transform matrices include DST-7 and DCT-8. Both these two transform kernels can be applied to in both the vertical and horizontal directions for transforms, which corresponds to 4 different combinations for horizontal (trHor) and vertical transform (trVer), e.g., as follows:

{trVer, trHor}={DST7, DST7}, {DST7, DCT8}, {DCT8, DST7}, {DCT8, DCT8}

For a given block (e.g., coding unit (CU)), an MTS index (mts_idx) syntax element may be signaled to indicate which primary transform kernels are used for the corresponding transform unit (TU). mts_idx=0 indicates DCT2 is being used, and mts_idx=[1-4] indicates 4 MTS candidates, as shown in the table below.

|  | mts_idx | | | | |
| --- | --- | --- | --- | --- | --- |
|  | 0 | 1 | 2 | 3 | 4 |
| trTypeHor | DCT2 | DST7 | DCT8 | DST7 | DCT8 |
| trTypeVer | DCT2 | DST7 | DST7 | DCT8 | DCT8 |

In the example of VVC, the corresponding binarization is as follows:

| mts_idx | bins |
| --- | --- |
| 0 | 0 |
| 1 | 10 |
| 2 | 110 |
| 3 | 1110 |
| 4 | 1111 |

In VVC, mts_idx is not signaled when the block only contains a DC coefficient, or the position of the last coefficient in scanning order (lastScanPos) is 0. In that case, mts_idx is inferred to be 0 (or DCT2 is applied). On the decoder side, the parsing of mts_idx happens after parsing of coefficients, so at the time of parsing of mts_idx, the value of lastScanPos is known.

B. Ray, M. Coban, V. Seregin, H. Egilmez, M. Karczewicz, "EE2: Enhanced intra MTS and LFNST (tests 4.1, 4.2, and 4.4)", $23^{rd}$ JVET Meeting, Teleconference, July 2021, document no. JVET-W0103, describes a TU size and intra mode dependent MTS for intra coding. In these techniques, the blocks are classified in 16 different size groups based on their width (W) and height (H), as described below:

| Size group →{W × H}= | | | |
| --- | --- | --- | --- |
| 0 →{4 × 4} | 1 → {4 × 8} | 2 →{4 × 16} | 3 →{4 × N} |
| 4 →{8 × 4} | 5 →{8 × 8} | 6 →{8 × 16} | 7 →{8 × N} |
| 8 →{16 × 4} | 9 →{16 × 8} | 10 →{16 × 16} | 11 →{16 × N} |
| 12 →{N × 4} | 13 →{N × 8} | 14 →{N × 16} | 15 →{N × N} | where N>=32.

According to the techniques of JVET-W0103, each size group is further classified into 5 mode-groups based on mode information. So, in total, 16*5=80 groups are considered:

| Mode group | Intra mode Id |
|---|---|
| 0 | 0 <= intramode <= 1 |
| 1 | 2 <= intramode <= 12 |
| 2 | 13 <= intramode <= 23 |
| 3 | 24 <= intramode <= 34 |
| 4 | MIP mode |

Thus, given a prediction mode and block size corresponds to a particular group. Each group has 4 transform pairs choices, which corresponds to a different signaled value of cu_mts_idx. Additionally, a joint mode and block symmetry is used for transform pair design. For Matrix-based Intra Prediction (MIP) coded blocks, the corresponding transpose flag may be used along with block shape symmetry. If the block is coded with DIMD mode, the dominant angular mode (having the highest weight) is used to derive the transform pairs.

For the wide-angle modes, the nearest conventional angular mode is used for transform set determination. For example, mode 2 is used for all the modes between −2 and −14. Similarly, mode 66 is used for mode 67 to mode 80. The mapping table is shown in the following to derive the group (among 80) given a prediction mode and block shape, as follows:

| Size \|\| mode | [0, 1] | [2-12] | [13-23] | [24-34] | MIP |
|---|---|---|---|---|---|
| 4 × 4 | 0 | 1 | 2 | 3 | 4 |
| 4 × 8 | 5 | 6 | 7 | 8 | 9 |
| 4 × 16 | 10 | 11 | 12 | 13 | 14 |
| 4 × N(>=32) | 15 | 16 | 17 | 18 | 19 |
| 8 × 4 | 20 | 21 | 22 | 23 | 24 |
| 8 × 8 | 25 | 26 | 27 | 28 | 29 |
| 8 × 16 | 30 | 31 | 32 | 33 | 34 |
| 8 × N(>=32) | 35 | 36 | 37 | 38 | 39 |
| 16 × 4 | 40 | 41 | 42 | 43 | 44 |
| 16 × 8 | 45 | 46 | 47 | 48 | 49 |
| 16 × 16 | 50 | 51 | 52 | 53 | 54 |
| 16 × N(>=32) | 55 | 56 | 57 | 58 | 59 |
| 32 × 4 | 60 | 61 | 62 | 63 | 64 |
| 32 × 8 | 65 | 66 | 67 | 68 | 69 |
| 32 × 16 | 70 | 71 | 72 | 73 | 74 |
| 32 × N(>=32) | 75 | 76 | 77 | 78 | 79 |

A transform pair index may be used to indicate a corresponding particular transform pair, where the mapping may be as follows. In this example, {DCT8, DCT8} indicates index 0, {DCT8, DST7} indicates index 1, and so on.

```
const uint8_t g_aucTrIdxToTr[25][2] =
{
  { DCT8, DCT8 },{ DCT8, DST7 },{ DCT8, DCT5 },{ DCT8, DST4 }, {DCT8, DST1},
  { DST7, DCT8 },{ DST7, DST7 },{ DST7, DCT5 },{ DST7, DST4 }, {DST7, DST1},
  { DCT5, DCT8 },{ DCT5, DST7 },{ DCT5, DCT5 },{ DCT5, DST4 }, {DCT5, DST1},
  { DST4, DCT8 },{ DST4, DST7 },{ DST4, DCT5 },{ DST4, DST4 }, {DST4, DST1},
  { DST1, DCT8 },{ DST1, DST7 },{ DST1, DCT5 },{ DST1, DST4 }, {DST1, DST1},
};
```

An example of four different transform-pair indexes for each of 80 groups (as specified previously) is shown below:

```
const uint8_t g_aucTrSet[80][4] =
{  { 17, 18, 23, 24},
   { 3, 7, 18, 22},
   { 2, 17, 18, 22},
   { 3, 15, 17, 18},
   { 3, 12, 18, 19},
   { 12, 18, 19, 23},
   { 2, 12, 17, 18},
   { 2, 17, 18, 22},
   { 2, 11, 17, 18},
   { 12, 18, 19, 23},
   { 12, 13, 16, 24},
   { 2, 11, 16, 23},
   { 2, 13, 17, 22},
   { 2, 11, 17, 21},
   { 13, 16, 19, 22},
   { 7, 12, 13, 18},
   { 1, 11, 12, 16},
   { 3, 13, 17, 22},
   { 1, 6, 12, 22},
   { 12, 13, 15, 16},
   { 18, 19, 23, 24},
   { 2, 17, 18, 24},
   { 3, 4, 17, 22},
   { 12, 18, 19, 23},
   { 12, 18, 19, 23},
   { 6, 12, 18, 24},
   { 2, 6, 12, 21},
   { 1, 11, 17, 22},
   { 3, 11, 16, 17},
   { 8, 12, 19, 23},
   { 7, 13, 16, 23},
   { 1, 6, 11, 12},
   { 1, 11, 17, 21},
   { 6, 11, 17, 21},
   { 8, 11, 14, 17},
   { 6, 11, 12, 21},
   { 1, 6, 11, 12},
   { 2, 6, 11, 12},
   { 1, 6, 11, 21},
   { 7, 11, 12, 16},
   { 8, 12, 19, 24},
   { 1, 13, 18, 22},
   { 2, 6, 17, 21},
   { 11, 12, 16, 19},
   { 8, 12, 17, 24},
   { 6, 12, 19, 21},
   { 6, 12, 13, 21},
   { 2, 16, 17, 21},
   { 6, 17, 19, 23},
   { 6, 12, 14, 17},
   { 6, 7, 11, 21},
   { 1, 11, 12, 16},
   { 1, 6, 11, 12},
   { 6, 11, 12, 21},
   { 7, 8, 9, 11},
   { 6, 7, 11, 12},
   { 6, 7, 11, 12},
   { 1, 11, 12, 16},
   { 6, 11, 17, 21},
   { 6, 7, 11, 12},
   { 12, 14, 18, 21},
   { 1, 11, 16, 22},
   { 1, 11, 16, 22},
   { 7, 13, 15, 16},
   { 1, 8, 12, 19},
   { 6, 7, 9, 12},
   { 2, 6, 12, 13},
   { 1, 12, 16, 21},
   { 7, 11, 16, 19},
   { 7, 8, 11, 12},
   { 6, 7, 11, 12},
   { 6, 7, 11, 12},
   { 1, 6, 11, 12},
   { 6, 7, 11, 16},
   { 6, 7, 11, 12},
   { 6, 7, 11, 12},
   { 6, 11, 12, 21},
   { 1, 6, 11, 12},
   { 6, 7, 11, 12},
```

{ 6, 7, 11, 12},
};

The mts_idx signaling may be the same as that of VVC, except mts_idx=[1, 4] may indicate different transform kernels for different TU shapes and intra prediction modes. In this example, mts_idx is not signaled when lastScanPos=0 as in that of VVC, and in that case mts_idx may be inferred to be 0. An example binarization of mts_idx, different compared to VVC, is shown below. Note, here the first bin indicates whether mts_idx=0 or not. If mts_idx is non-zero, then additionally a 2-bit fixed length code is used for mts_idx=[1, 4] as those mts_idx are used roughly equiprobable.

| mts_idx | bins |
|---------|------|
| 0 | 0 |
| 1 | 100 |
| 2 | 101 |
| 3 | 110 |
| 4 | 111 |

This disclosure recognizes that, in the techniques of JVET-W0103, for all TUs, the number of non-DCT2 transform candidates is fixed to four, which may not be optimal. For example, a TU which has low residual energy or few transform coefficients may benefit from the usage of a smaller number of transform choices due to less overhead. On the other hand, a TU which has higher residual energy, or a lot of transform coefficients, may benefit from a higher number of transform choices due to better diversity.

This disclosure further recognizes that the overhead signaling of mts_idx may partially inhibit the true potential of MTS. So, it is beneficial to reduce this overhead.

The techniques of this disclosure allow for a variable number of MTS candidates to be possible for a given block (e.g., a given TU). These techniques may also reduce signaling overhead associated with MTS.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptively determining MTS candidates for a block of video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptively determining MTS candidates for a block of video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use adaptive determination of MTS candidates for a block of video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

In some examples, the transform process may include multiple transforms. That is, video encoder 200 may perform a multiple transform selection (MTS) process, including selecting an MTS candidate from a set of MTS candidates. Such MTS candidates may include pairs of horizontal and vertical transforms, e.g., discrete cosine transforms (DCTs), discrete sine transforms (DSTs), or the like. DCTs and DSTs may include a variety of different types, e.g., DCT1, DCT2, DCT8. According to the techniques of this disclosure, video encoder 200 may determine a variable number of MTS candidates to include in a set of MTS candidates for a current block of video data based on one or more of a variety of factors. That is, whereas in conventional techniques there was a fixed number (four) of MTS candidates for each block, video encoder 200 may use a different numbers of MTS candidates for different blocks of the same set of video data.

In one example, video encoder 200 may determine the number of MTS candidates for a current block of video data according to a number of non-zero coefficients of a transform block of the current block. For example, video encoder 200 may calculate a sum of values of significant coefficient flags for the transform block. The significant coefficient flags generally represent whether corresponding transform coefficients are "significant," i.e., have an absolute value greater than zero (i.e., a non-zero value).

In some examples, video encoder 200 may calculate an absolute sum of the values of the non-zero coefficients of the transform block and use the calculated absolute sum to determine the number of MTS candidates for the transform block. Video encoder 200 may determine available sets of MTS candidates for a video bitstream based on, e.g., a profile, tier, or level of an applicable video coding standard, which may indicate which sets of MTS candidates are to be supported for a given profile, tier, and/or level of the standard. In some examples, video encoder 200 may test each possible MTS candidate using a rate-distortion (RD) analysis, but if one or more of the tested MTS candidates is not supported by a corresponding profile/tier/level of the standard, video encoder 200 may invalidate that MTS candidate to reduce the determined number of MTS candidates.

After determining the number of MTS candidates for the transform block, video encoder 200 may select an MTS candidate to use to transform the transform block. Video encoder 200 may then encode data representing the selected MTS candidate, such as an MTS index representing the selected one of the MTS candidates. In some examples, video encoder 200 may arrange an order of the MTS candidates according to discontinuity measures across one or more block boundaries for the current block. In some examples, when encoding the MTS index value, video encoder 200 may determine a context for entropy encoding the MS index value according to the number of MTS candidates. Video encoder 200 may further apply the selected MTS candidate to transform the residual block to form the transform block.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. In particular, video decoder 300 may initially use data for the transform block to determine a number of MTS candidates for the transform block. For example, video decoder 300 may determine the number of MTS candidates according to a number of non-zero transform coefficients of the transform block. As another example, video decoder 300 may determine the number of MTS candidates according to an absolute sum of the transform coefficients of the transform block. That is, video decoder 300 may determine a sum of absolute values of the transform coefficients to calculate the absolute sum.

Video decoder 300 may further decode an MTS index representing one of the MTS candidates of the number of MTS candidates to be used to inverse transform the transform block. Video decoder 300 may then determine the MTS candidate of the number of MTS candidates using the MTS index, then inverse transform the transform block using the corresponding MTS candidate to reproduce the residual block. In some examples, video decoder 300 may entropy decode the MTS index value using a context corresponding to the number of non-zero transform coefficients and/or the absolute sum of the transform coefficients.

Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

According to the techniques of this disclosure, a number of MTS candidates for a transform block may vary based on, e.g., a number of non-zero transform coefficients of the transform block (which may include, e.g., an absolute sum of the transform coefficients). In this manner, index values may be reduced for certain blocks of video data, e.g., where the number of MTS candidates is smaller than 4. Reduction of the index values in this manner may reduce the bitrate for the overall video bitstream. Moreover, allowing for a greater number of MTS candidates than 4 may allow for an MTS candidate that performs better (in terms of compressing energy of the transform block expressed in the transform domain) than the original 4 MTS candidates, which may also reduce the bitrate for the overall video bitstream.

Figure 2:
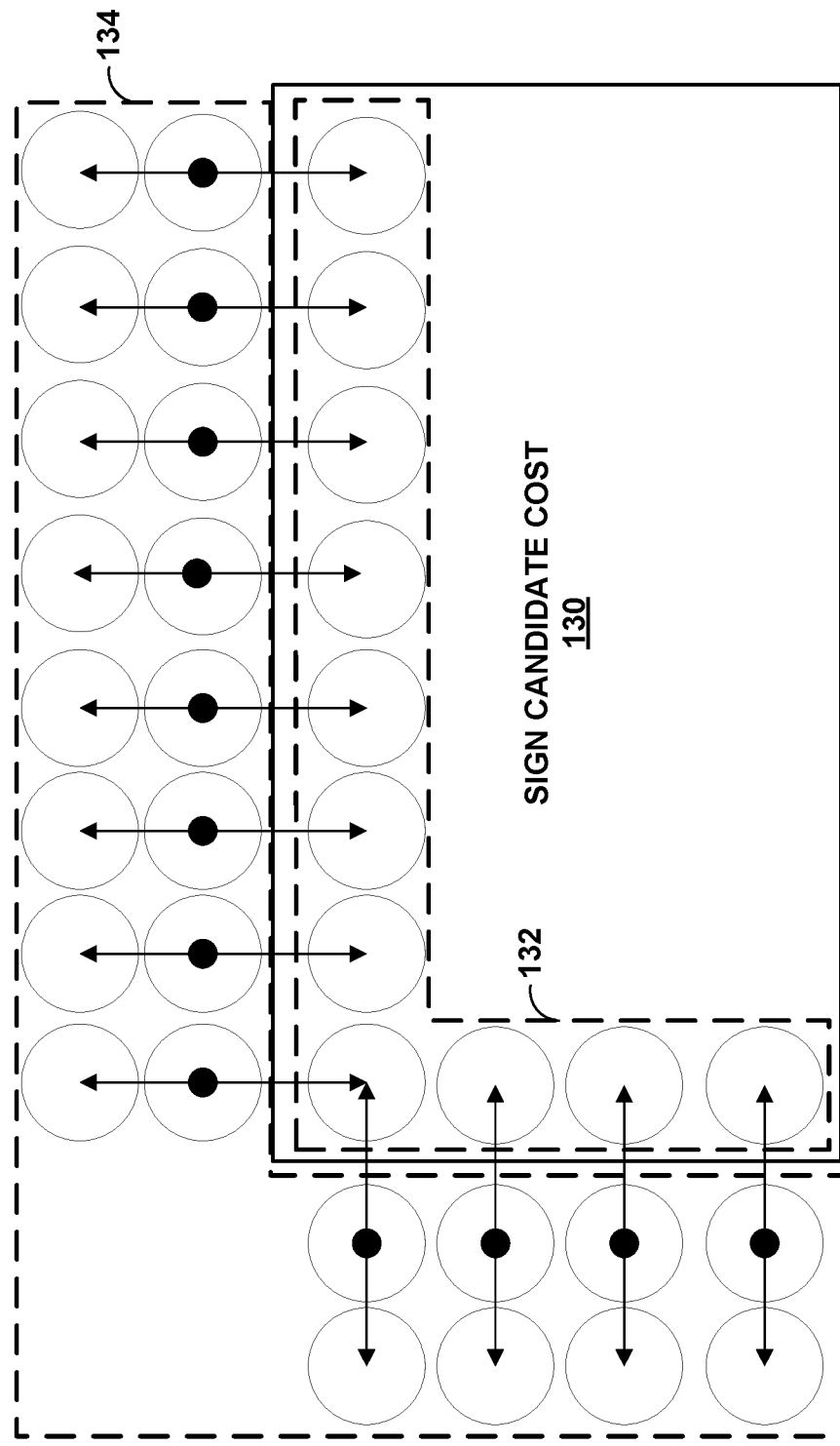
FIG. 2 is a conceptual diagram illustrating an example of determining a predicted sign candidate for transform coefficients according to a discontinuity measure for a block of video data.

FIG. 2 is a conceptual diagram illustrating an example of determining a predicted sign candidate for transform coefficients according to a discontinuity measure for a block of video data. In some examples, video encoder 200 and video decoder 300 may be configured to use coefficient sign prediction for transform coefficients according to boundary discontinuities. The basic idea of coefficient sign prediction is for a video coder (e.g., video encoder 200 or video decoder 300) to calculate reconstructed residual for both negative and positive sign combinations for applicable transform coefficients and then select the hypothesis that minimizes a cost function.

To derive the best sign, the cost function is defined as a discontinuity measure across block boundary, e.g., as shown in FIG. 2. FIG. 2 depicts current block 130 including reconstructed sign candidates 132. Neighboring blocks to current block 130 include reconstructed neighbors 134. The cost function may be measured for all hypotheses, and the video coder may select the hypothesis resulting in the smallest cost as a predictor for coefficient signs.

The cost function may be defined as a sum of absolute second derivatives in the residual domain for the above row and left column, e.g., as follows:

$$\text{cost} = \Sigma_{x=o}^{w} |(-R_{x,-1} + 2R_{x,0} - P_{x,1}) - r_{x,1}| + \Sigma_{y=o}^{h} |(-R_{-1,y} + 2R_{0,y} - P_{1,y}) - r_{1,y}|$$

where R is reconstructed neighbors 134, P is prediction of current block 130, and r is the residual hypothesis. The term $(-R_{-1} + 2R_0 - P_1)$ can be calculated only once per block and only residual hypothesis is subtracted.

According to the techniques of this disclosure, video encoder 200 and video decoder 300 may be configured to use a variable number of non-DCT2 MTS candidates, instead of a fixed number of candidates (e.g., four). The variable number may depend on the last scan position (lastScanPos) value, as described below. In one example, given a set of thresholds TH[i], and number of MTS candidates NCand[i], where NCand[i]>NCand[i−1] and TH[i]>TH[i−1] for i=[0, N−1], and TH[0]>=0, NCand[0]>=0, the number of MTS candidates may be derived as follows:

| lastScanPos | Number of non-DCT2 MTS candidates |
|---|---|
| [0, TH[0]] | NCand[0] |
| (TH[0], TH[1]] | NCand[1] |
| (TH[1], TH[2]] | NCand[2] |
| ⋮ | ⋮ |
| (TH[i], TH[i + 1]] | NCand[i] |
| ⋮ | ⋮ |
| (TH[N − 1], TH[N]] | NCand[N − 1] |

In this example, the mts_idx has a possible range of [0, NCand[i]], where mts_idx=0 indicates DCT2, while the other indicates non-DCT2 transform candidates. For the coding of mts_idx, a similar methodology may be used to that of JVET-W0103.

Video encoder 200 and video decoder 300 may be configured according to any or all of the following in accordance with the techniques of this disclosure:

A first bin is signaled whether mts_idx=0 or not.

If NCand[i]>1, then a truncated binary code is used to indicate which non-DCT2 transform candidate is used. And the binarization of Truncated binary (TB) code depends on the value of NCand[i] the maximum value parameter is set to NCand[i]. Alternatively, truncated unary binarization, or Exponential Golomb or other variable length coding. The bins may be context or bypass coded.

If Ncand[i] equals to 1, no further signaling is required (as the first (and only) bin with a value of 1 indicates that non-DCT2 transform is used.

As the probability of mts_idx=0 may depend on NCand[i], separate contexts for the first bin of mts_idx may be defined depending on NCand[i] value.

In some examples, the set of transforms can also be defined in a way that NCand[i−1] is a subset of NCand[i]. For example, NCand[ ] can be used as {1, 4, 6}, and Ti is the $i_{th}$ transform candidate. Here, still when only lastScanPos=0, mts_idx is not signaled (similar to VVC). Then, MTS candidates include {T0, T1, T2, T3, T4, T5}
lastScanPos≤TH[0]➔ Set1:{T0}
TH[0]<lastScanPos≤TH[1]➔ Set2:{T0, T1, T2, T3}
lastScanPos>TH[1]➔ Set3:{T0, T1, T2, T3, T4, T5}

Figure 3:
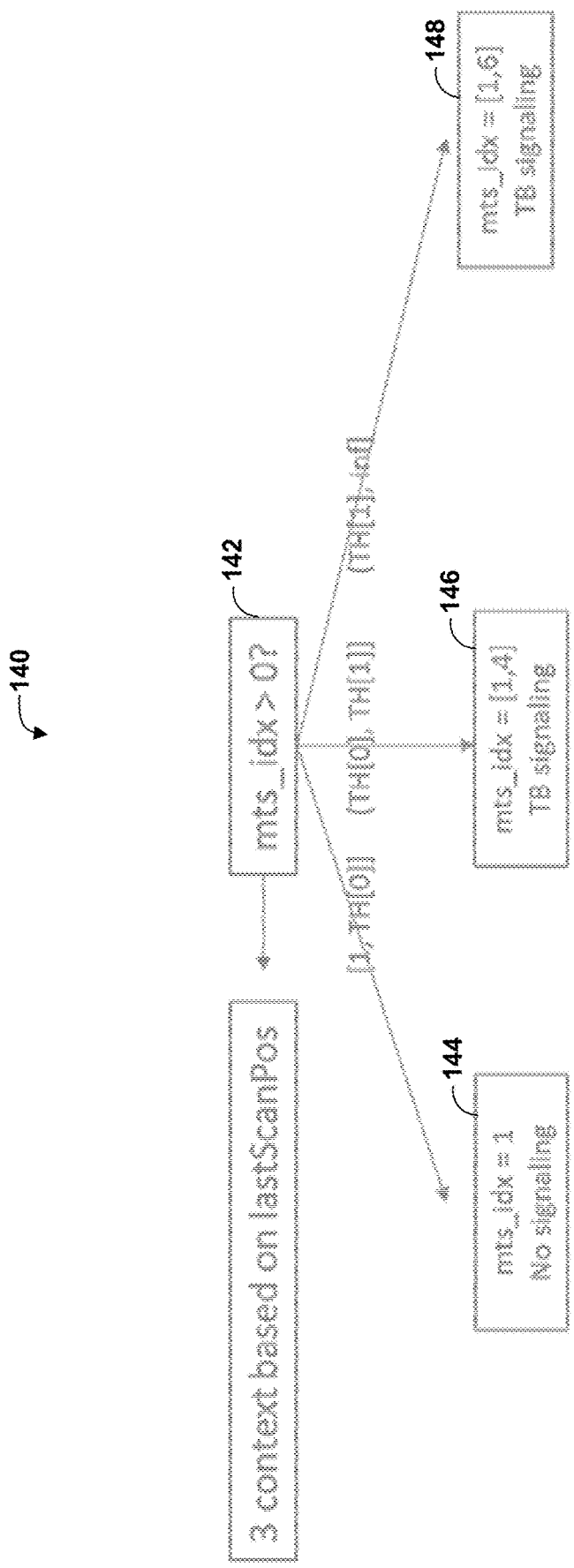
FIG. 3 is a flow diagram illustrating an example of MTS index signaling according to the techniques of this disclosure.

FIG. 3 is a flow diagram illustrating an example of MTS index signaling according to the techniques of this disclosure. FIG. 3 depicts an example according to the example techniques discussed above for mts_idx signaling. In this example, initially, a video coder (e.g., video encoder 200 or video decoder 300) determines whether the MTS index (mts_idx) value is greater than zero (142). If so, the video coder may further determine a range of threshold values between which the last scan position occurs.

In this example, if the last scan position is between 1 and threshold zero (TH[0]) (including 1 and threshold zero), the value of mts_idx is inferred to be equal to 1, and no signaling is needed (144). That is, there is only one possible MTS candidate in this example. If the last scan position occurs between threshold zero (exclusive) and threshold one (TH[1]) (inclusive), mts_idx has a value between 1 and 4, inclusive, and is signaled using a truncated binary codeword (146). Thus, there are four MTS candidates in this example. If the last scan position is greater than threshold one, mts_idx has a value between 1 and 6, and is signaled using a truncated binary codeword (148). Thus, there are six MTS candidates in this example.

In some examples, {TH[0], TH[1]} is set equal to {6, 32}.

Adaptive MTS may be combined with intra-MTS, so transform kernels may still be dependent on intra mode and TU size, as well as having an adaptive number of transform choices. An example, 6 candidates: {T0, T1, T2, T3, T4, T5} for 80 groups (as defined in JVET-W0103) may be as follows:

```
const uint8_t g_aucTrSet[80][6] =
{
    //T0:0, 1, 2, 3, 4, 5,
    { 18, 24, 17, 23, 8, 12},
    //T1:0, 1, 2, 3, 4, 5,
    { 18, 3, 7, 22, 0, 16},
    //T2:0, 1, 2, 3, 4, 5,
    { 18, 2, 17, 22, 3, 23},
    //T3:0, 1, 2, 3, 4, 5,
    { 18, 3, 15, 17, 12, 23},
    //T4:0, 1, 2, 3, 4, 5,
    { 18, 12, 3, 19, 10, 13},
    //T5:0, 1, 2, 3, 4, 5,
    { 18, 12, 19, 23, 13, 24},
    //T6:0, 1, 2, 3, 4, 5,
    { 18, 12, 17, 2, 3, 23},
    //T7:0, 1, 2, 3, 4, 5,
    { 18, 2, 17, 22, 12, 23},
    //T8:0, 1, 2, 3, 4, 5,
    { 18, 2, 11, 17, 22, 23},
    //T9:0, 1, 2, 3, 4, 5,
    { 18, 12, 19, 23, 3, 10},
    //T10:0, 1, 2, 3, 4, 5,
    { 16, 12, 13, 24, 7, 8},
    //T11:0, 1, 2, 3, 4, 5,
    { 16, 2, 11, 23, 12, 18},
    //T12:0, 1, 2, 3, 4, 5,
    { 13, 17, 2, 22, 12, 18},
    //T13:0, 1, 2, 3, 4, 5,
    { 17, 11, 2, 21, 12, 18},
    //T14:0, 1, 2, 3, 4, 5,
    { 16, 13, 19, 22, 3, 10},
    //T15:0, 1, 2, 3, 4, 5,
    { 18, 12, 13, 7, 14, 22},
    //T16:0, 1, 2, 3, 4, 5,
    { 16, 12, 11, 1, 18, 22},
    //T17:0, 1, 2, 3, 4, 5,
    { 17, 13, 3, 22, 12, 18},
    //T18:0, 1, 2, 3, 4, 5,
    { 6, 12, 1, 22, 13, 17},
    //T19:0, 1, 2, 3, 4, 5,
    { 16, 12, 13, 15, 2, 23},
    //T20:0, 1, 2, 3, 4, 5,
    { 18, 24, 23, 19, 12, 17},
    //T21:0, 1, 2, 3, 4, 5,
    { 18, 24, 2, 17, 0, 23},
    //T22:0, 1, 2, 3, 4, 5,
    { 17, 3, 4, 22, 2, 13},
    //T23:0, 1, 2, 3, 4, 5,
    { 18, 12, 19, 23, 3, 15},
    //T24:0, 1, 2, 3, 4, 5,
    { 18, 12, 19, 23, 3, 10},
    //T25:0, 1, 2, 3, 4, 5,
    { 6, 12, 18, 24, 13, 19},
    //T26:0, 1, 2, 3, 4, 5,
    { 6, 12, 2, 21, 13, 18},
    //T27:0, 1, 2, 3, 4, 5,
    { 17, 11, 1, 22, 2, 18},
    //T28:0, 1, 2, 3, 4, 5,
    { 16, 17, 3, 11, 12, 23},
    //T29:0, 1, 2, 3, 4, 5,
    { 8, 12, 19, 23, 11, 24},
    //T30:0, 1, 2, 3, 4, 5,
    { 16, 13, 7, 23, 12, 19},
    //T31:0, 1, 2, 3, 4, 5,
    { 6, 12, 1, 11, 18, 22},
    //T32:0, 1, 2, 3, 4, 5,
    { 17, 11, 1, 21, 12, 18},
    //T33:0, 1, 2, 3, 4, 5,
    { 6, 11, 17, 21, 12, 18},
    //T34:0, 1, 2, 3, 4, 5,
    { 8, 11, 14, 17, 12, 22},
    //T35:0, 1, 2, 3, 4, 5,
    { 6, 12, 11, 21, 14, 16},
    //T36:0, 1, 2, 3, 4, 5,
    { 6, 12, 11, 1, 17, 21},
    //T37:0, 1, 2, 3, 4, 5,
    { 6, 12, 11, 2, 17, 21},
    //T38:0, 1, 2, 3, 4, 5,
    { 6, 11, 21, 1, 12, 17},
    //T39:0, 1, 2, 3, 4, 5,
    { 16, 12, 11, 7, 1, 5},
    //T40:0, 1, 2, 3, 4, 5,
    { 8, 12, 19, 24, 11, 17},
    //T41:0, 1, 2, 3, 4, 5,
    { 18, 13, 1, 22, 2, 24},
    //T42:0, 1, 2, 3, 4, 5,
    { 6, 2, 17, 21, 19, 22},
    //T43:0, 1, 2, 3, 4, 5,
    { 16, 12, 11, 19, 8, 15},
    //T44:0, 1, 2, 3, 4, 5,
    { 8, 12, 17, 24, 13, 15},
    //T45:0, 1, 2, 3, 4, 5,
    { 6, 12, 19, 21, 17, 18},
    //T46:0, 1, 2, 3, 4, 5,
    { 6, 12, 13, 21, 2, 18},
    //T47:0, 1, 2, 3, 4, 5,
    { 16, 2, 17, 21, 1, 11},
    //T48:0, 1, 2, 3, 4, 5,
    { 6, 17, 19, 23, 12, 16},
    //T49:0, 1, 2, 3, 4, 5,
    { 6, 12, 14, 17, 8, 22},
    //T50:0, 1, 2, 3, 4, 5,
    { 6, 7, 11, 21, 9, 12},
```

-continued

```
//T51:0, 1, 2, 3, 4, 5,
{ 16, 12, 11, 1, 7, 21},
//T52:0, 1, 2, 3, 4, 5,
{ 6, 12, 11, 1, 17, 21},
//T53:0, 1, 2, 3, 4, 5,
{ 6, 12, 11, 21, 1, 16},
//T54:0, 1, 2, 3, 4, 5,
{ 8, 7, 9, 11, 12, 21},
//T55:0, 1, 2, 3, 4, 5,
{ 6, 12, 7, 11, 14, 21},
//T56:0, 1, 2, 3, 4, 5,
{ 6, 12, 7, 11, 1, 21},
//T57:0, 1, 2, 3, 4, 5,
{ 16, 12, 11, 1, 2, 21},
//T58:0, 1, 2, 3, 4, 5,
{ 6, 11, 17, 21, 1, 12},
//T59:0, 1, 2, 3, 4, 5,
{ 6, 12, 7, 11, 9, 21},
//T60:0, 1, 2, 3, 4, 5,
{ 18, 12, 14, 21, 6, 21},
//T61:0, 1, 2, 3, 4, 5,
{ 16, 11, 1, 22, 2, 17},
//T62:0, 1, 2, 3, 4, 5,
{ 16, 11, 1, 22, 2, 17},
//T63:0, 1, 2, 3, 4, 5,
{ 16, 13, 15, 7, 14, 19},
//T64:0, 1, 2, 3, 4, 5,
{ 8, 12, 1, 19, 16, 23},
//T65:0, 1, 2, 3, 4, 5,
{ 6, 12, 7, 9, 13, 21},
//T66:0, 1, 2, 3, 4, 5,
{ 6, 12, 13, 2, 7, 18},
//T67:0, 1, 2, 3, 4, 5,
{ 16, 12, 1, 21, 11, 17},
//T68:0, 1, 2, 3, 4, 5,
{ 16, 11, 7, 19, 12, 15},
//T69:0, 1, 2, 3, 4, 5,
{ 8, 12, 7, 11, 14, 21},
//T70:0, 1, 2, 3, 4, 5,
{ 6, 12, 7, 11, 8, 9},
//T71:0, 1, 2, 3, 4, 5,
{ 6, 12, 7, 11, 2, 21},
//T72:0, 1, 2, 3, 4, 5,
{ 6, 12, 1, 11, 21, 22},
//T73:0, 1, 2, 3, 4, 5,
{ 6, 7, 11, 16, 9, 12},
//T74:0, 1, 2, 3, 4, 5,
{ 6, 12, 7, 11, 9, 21},
//T75:0, 1, 2, 3, 4, 5,
{ 6, 12, 7, 11, 13, 17},
//T76:0, 1, 2, 3, 4, 5,
{ 6, 12, 11, 21, 2, 7},
//T77:0, 1, 2, 3, 4, 5,
{ 6, 12, 1, 11, 2, 7},
//T78:0, 1, 2, 3, 4, 5,
{6, 12, 7, 11, 16, 21},
//T79:0, 1, 2, 3, 4, 5,
{6, 12, 7, 11, 9, 16},
};
```

In some examples, the adaptation of the number of MTS candidates can also be based on a number of non-zero coefficients (instead of lastScanPos). For example, a video coder may determine a sum of values of significant coefficient flags for a transform block to determine the number of non-zero coefficients.

In some examples, the number of MTS candidates can also (additionally or alternatively) be based on an absolute sum of the non-zero coefficients of the transform block. That is, after having reconstructed the transform block, the video coder (e.g., video encoder 200 or video decoder 300) may determine absolute values for each of the transform coefficients of the transform block, then add the absolute values together to form the absolute sum value. The video coder may then determine the number of MTS candidates according to the absolute sum value. For example, the video coder may determine a range of values (thresholds) including the absolute sum value, and each possible range may be mapped to a number of MTS candidates. Thus, the video coder may determine that the number of MTS candidates is the number of MTS candidates to which the range including the absolute sum value is mapped, in a manner similar to that described above with respect to the last non-zero scan position.

In some examples, the thresholds (TH[i]) and the number of non-DCT2 candidates (NCand[i]) can be dependent on the QP of the transform block.

In some examples, the thresholds and/or the number of non-DCT2 candidates can be signaled in the sequence/picture parameter set, or picture header or slice header. Alternatively, those parameters can also be predetermined (fixed) at video encoder 200 and video decoder 300, and thus, no additional signaling is required.

In some examples, similar techniques can also be applied for low frequency non-separable transform (LFNST) candidates. The parameters can be different for luma and chroma components when applicable. The parameters can be signaled in different parameter sets or headers or they can be predetermined/fixed.

Figure 4:
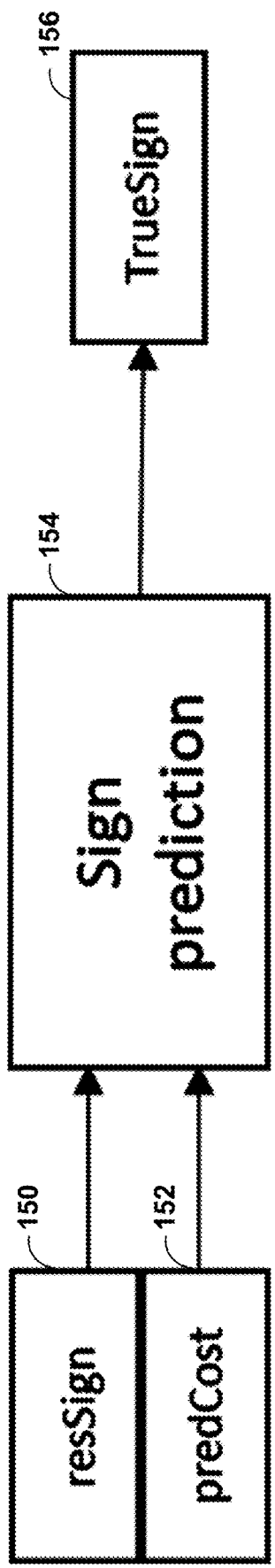
FIG. 4 is a conceptual diagram illustrating an example of MTS index prediction using boundary discontinuities according to the techniques of this disclosure.

FIG. 4 is a conceptual diagram illustrating an example of MTS index prediction using boundary discontinuities according to the techniques of this disclosure. In accordance with certain example techniques, a boundary discontinuity is used to jointly predict mts_idx and coefficient sign. In particular, mts_idx codewords may be reordered based on boundary discontinuity cost, with the mts_idx with lowest boundary discontinuity cost placed first (with shortest codeword), and the mts_idx with highest boundary discontinuity cost placed last (with the largest codeword). With a good prediction accuracy, a smaller number of bits may be needed to code mts_idx.

The example of FIG. 4 depicts a simplified block diagram of a sign prediction module 154, where the boundary cost of different hypotheses is stored in predCost 152. Sign prediction module 154 may use predCost 152 and the sign residual (resSign) 150 as inputs. Sign prediction module 154 may add or XOR the sign residual (resSign 150) with the predicted sign (predCost 152) to generate a true sign value (trueSign 156), e.g., trueSign=XOR(resSign, predSign). Video encoder 200 may then encode the sign residual.

For mts_idx prediction, sign prediction may be applied for all mts_idx, and mts_idx may be reordered based on boundary discontinuity cost. In one example, there may be five candidates for MTS, i.e., mts_idx E [0, 4]. Then video encoder 200 and video decoder 300 may calculate predCost for each mts_idx:predCost[i]. For each of those 5 combinations, video encoder 200 and video decoder 300 may determine the resultant sign (CandSign[i]), which represents different candidates for the actual sign.

Figure 5:
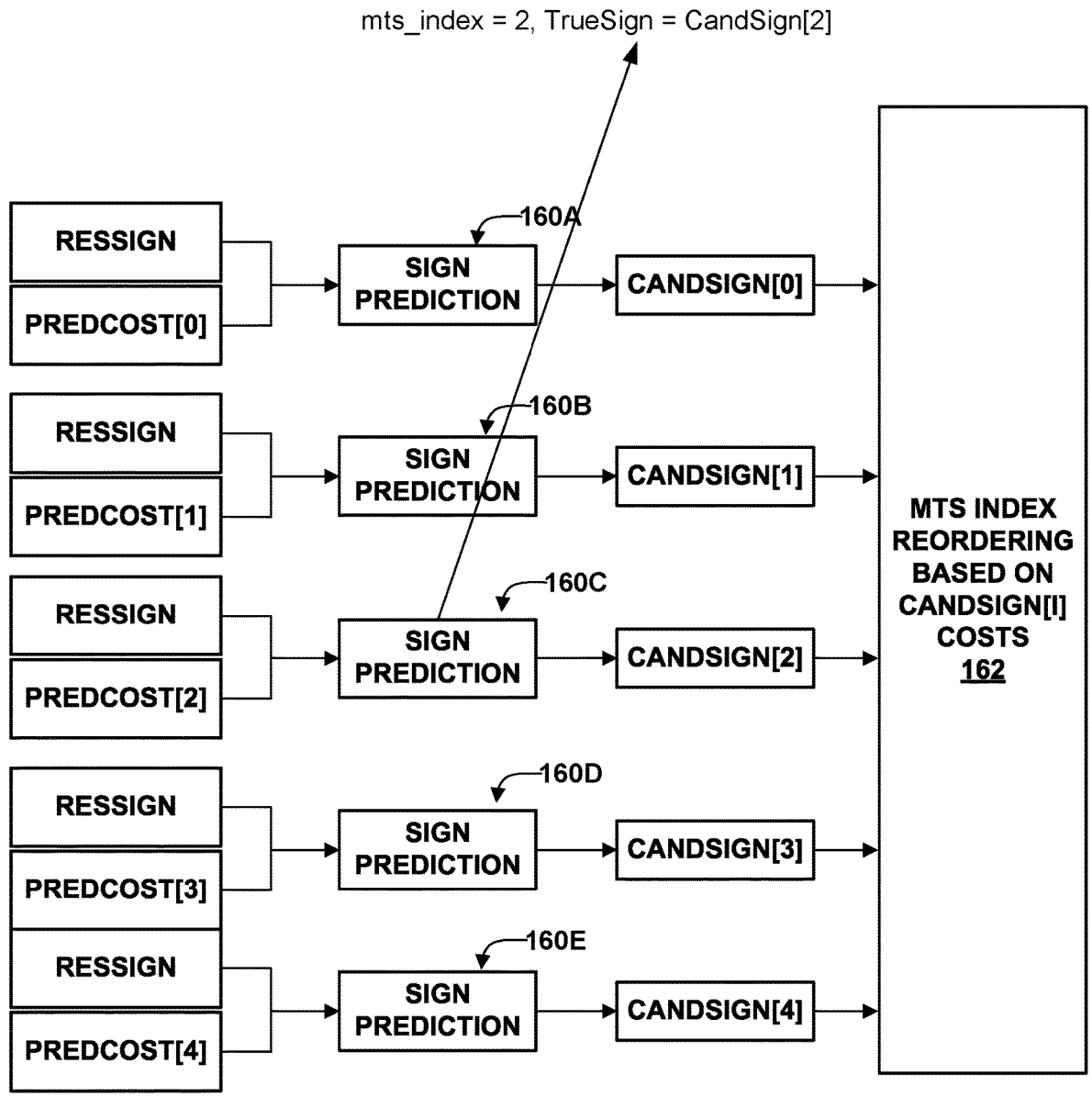
FIG. 5 is a conceptual diagram illustrating another example of MTS index prediction using boundary discontinuities according to the techniques of this disclosure.

FIG. 5 is a conceptual diagram illustrating another example of MTS index prediction using boundary discontinuities according to the techniques of this disclosure. In particular, FIG. 5 depicts a series of candidate sign cost predictors 160A-160E, each similar to that of FIG. 4. After performing the techniques discussed above with respect to FIG. 4, video encoder 200 and video decoder 300 may reorder mts_idx based on boundary discontinuity of CandSign costs using reordering unit 162. In one example, Cost(CandSign[2])<Cost(CandSign[1])<Cost(CandSign[0])<Cost (CandSign[3])<Cost(CandSign[4]). Then reordering unit 162 reorders the mts_idx, and the reordered mts_idx uses TU binarization. Then:

| mts_idx | Bins with reordering | Bins without reordering As in VVC |
|---|---|---|
| 2 | 0 | 110 |
| 1 | 10 | 10 |
| 0 | 110 | 0 |
| 3 | 1110 | 1110 |
| 4 | 1111 | 1111 |

If CandSign[2] is indeed the trueSign, i.e., the true mts_idx is 2, then with reordering, only "0" needs to be signaled, instead of in the un-reordered list where "110" needs to be signaled. The bins may be either context or bypass coded.

Other binarizations, such as Exp-Golomb or truncated binary can be also used after reordering. Each bin may have dedicated contexts for entropy coding.

Mts_idx prediction can be combined with adaptive number of MTS candidates. So, the number of predCost calculation may depend on the number of mts candidates as identified by lastScanPos, e.g., as discussed above.

In some examples, mts_idx prediction can be applied for all MTS candidates (including DCT2). In some examples, the mts_idx prediction can be only limited to non-DCT2 candidates to reduce encoding and decoding runtime.

Figure 6:
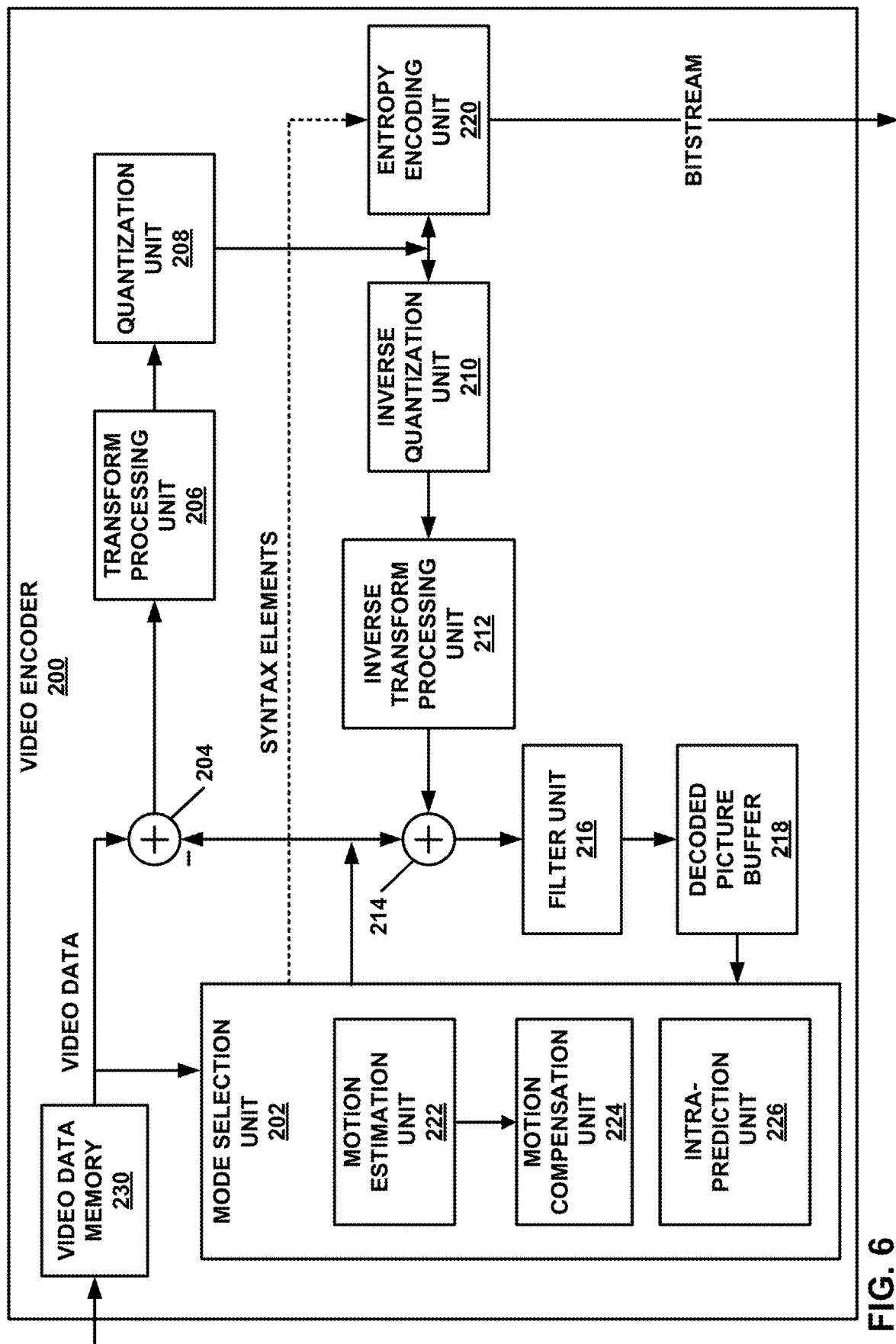
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202.

Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. Transform processing unit 206 may be configured to apply any of the various techniques of this disclosure for adaptively determining a variable number of MTS candidates and transforming a residual block using one of the number of MTS candidates.

For example, transform processing unit 206 may apply an MTS to a residual block to form a transform block. In some examples, transform processing unit 206 may apply a variety of different MTSs to a residual block to form various different transform blocks, and determine which of the MTSs performs best to compress the energy of the transform block. For instance, if one of the MTSs yields a transform block with fewer significant (non-zero) transform coefficients than other MTSs, video encoder 200 may select that MTS over the other MTSs. Moreover, transform processing unit 206 may send an index value indicating the selected MTS to entropy encoding unit 220, which may entropy encode the index value. In some examples, entropy encoding unit 220 may use a number of non-zero transform coefficients (e.g., a sum of significant coefficient flags or an absolute sum of the transform coefficients, following quantization by quantization unit 208) to select a context for context-based entropy encoding the index value (e.g., mts_idx).

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Furthermore, inverse transform processing unit 212 may be configured to apply any of the various techniques of this disclosure for adaptively determining a variable number of MTS candidates and transforming a residual block using one of the number of MTS candidates.

For example, inverse transform processing unit 212 may determine the number of MTS candidates according to a number of non-zero (significant) transform coefficients of the transform block. In some examples, inverse transform processing unit 212 may determine the number of MTS candidates according to an absolute sum of the transform coefficients. After determining the number of MTS candidates, inverse transform processing unit 212 may use an MTS index to determine which of the MTS candidates is to be used to inverse transform the transform block.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
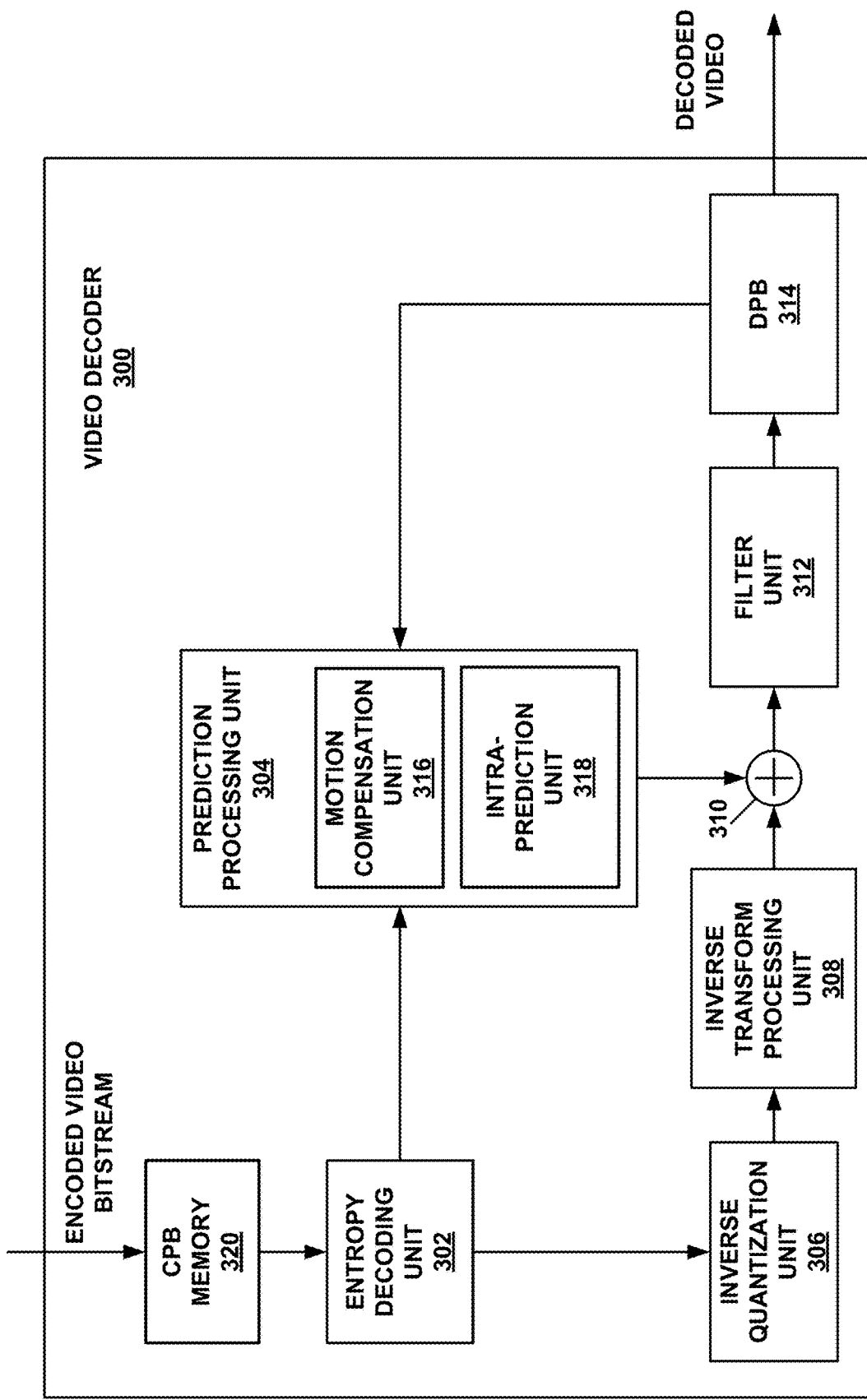
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, an inverse MTS, or another inverse transform to the transform coefficient block. Inverse transform processing unit 308 may be configured to apply any of the various techniques of this disclosure for adaptively determining a variable number of MTS candidates and transforming a residual block using one of the number of MTS candidates.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 8:
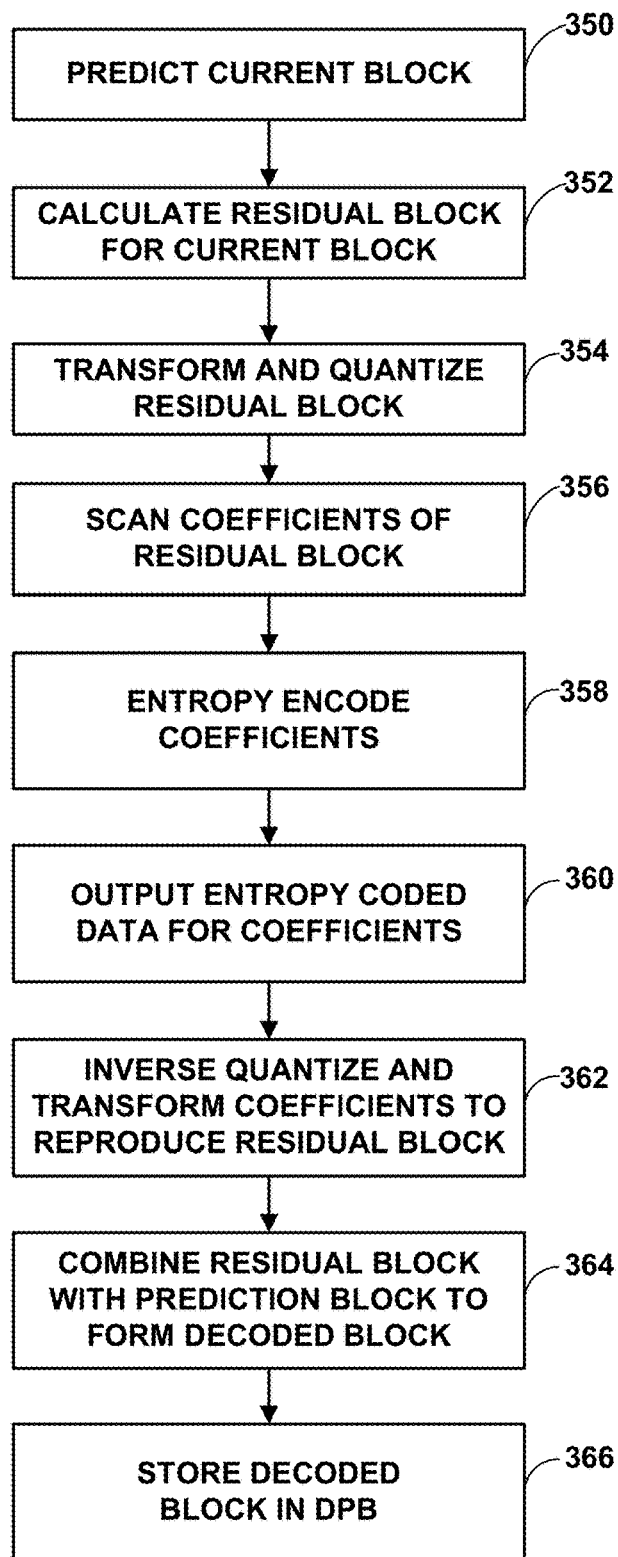
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Transforming the residual block may be performed according to any of the various MTS techniques of this disclosure, alone or in any combination. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Again, inverse transformation may include any of the various MTS techniques of this disclosure, in any combination. Video encoder 200 may combine the residual block with the prediction block to form a decoded block (364). Video encoder 200 may then store the decoded block in DPB 218 (366).

Figure 9:
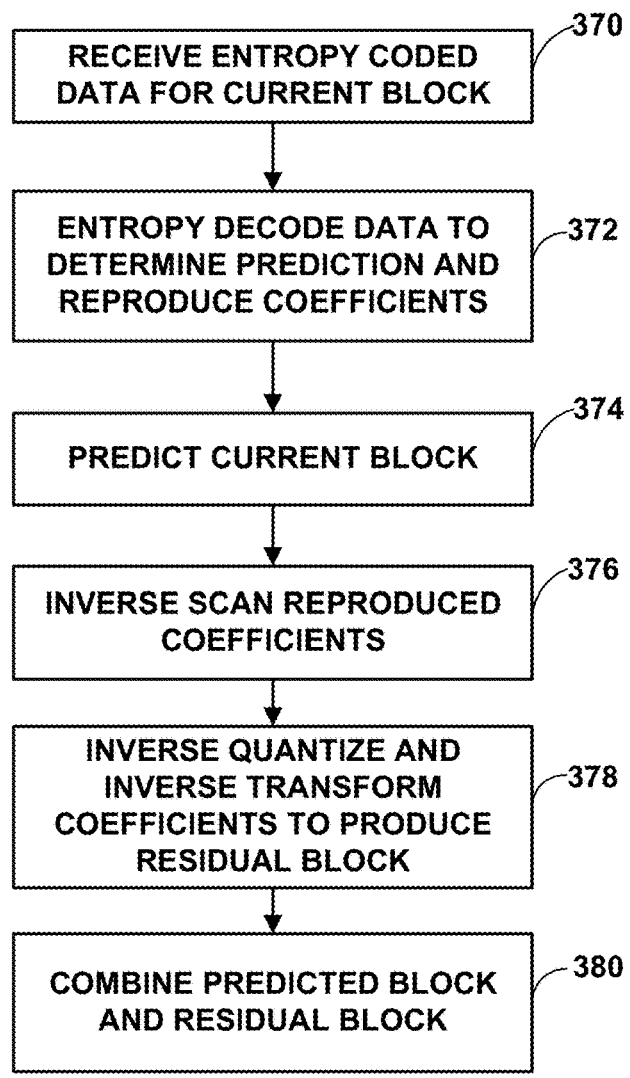
FIG. 9 is a flowchart illustrating an example method for decoding a current block in accordance with the techniques of this disclosure.

FIG. 9 is a flowchart illustrating an example method for decoding a current block of video data in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). The inverse transform may be in accordance with any of the various MTS techniques of this disclosure. Video decoder 300 may ultimately decode the current block by combining the prediction block and the residual block (380).

In this manner, the method of FIG. 9 represents an example of a method of decoding video data including determining a number of multiple transform selection (MTS) candidates for a current block of video data, the number being greater than zero and different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Figure 10:
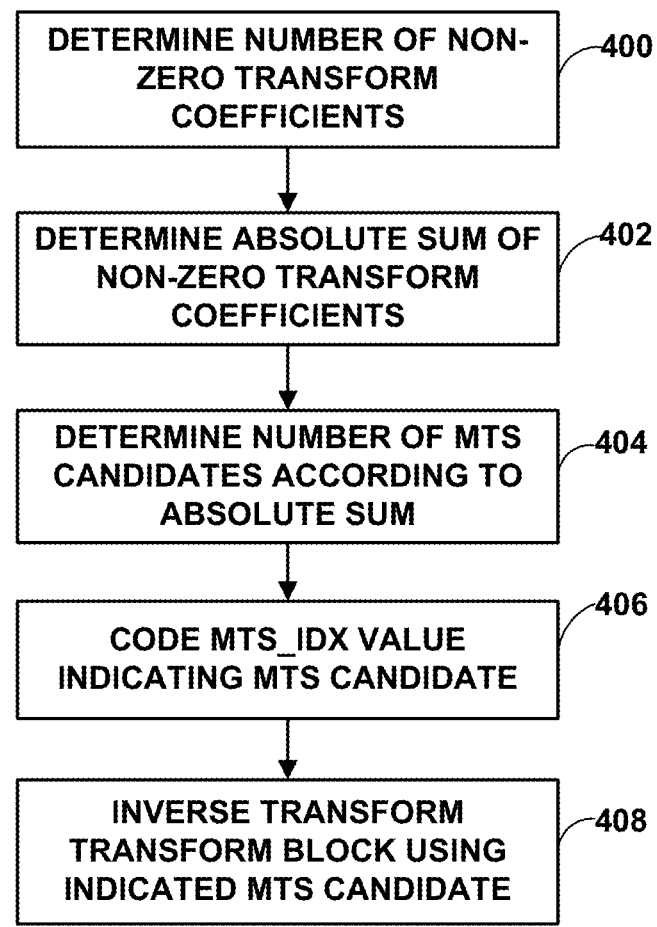
FIG. 10 is a flowchart illustrating an example method of inverse transforming a transform block of video data according to the techniques of this disclosure.

FIG. 10 is a flowchart illustrating an example method of inverse transforming a transform block of video data according to the techniques of this disclosure. The method of FIG. 10 may be performed by video encoder 200 (e.g., at step 362 of FIG. 8) or video decoder 300 (e.g., at step 378 of FIG. 9). For purposes of example and explanation, the method of FIG. 10 is described with respect to video decoder 300.

Initially, video decoder 300 may determine a number of non-zero transform coefficients (400) of a transform block. For example, video decoder 300 may decode significant transform flags of transform coefficients of the transform block, then calculate a sum of the values of the significant transform flags. Video decoder 300 may then determine an absolute sum of the non-zero transform coefficients (402). For example, for each non-zero transform coefficient, video decoder 300 may calculate an absolute value of the transform coefficient, then add each of the absolute values of the transform coefficients.

Video decoder 300 may then determine a number of MTS candidates for the transform block according to the absolute sum (404). For example, video decoder 300 may have a variety of different ranges (between two threshold values) each corresponding to different numbers of MTS candidates. Video decoder 300 may determine which range includes the absolute sum of the transform coefficients, then determine the number of MTS candidates corresponding to the determined range.

Video decoder 300 may also code an mts_idx (MTS index) value indicating an MTS candidate (406). For example, video decoder 300 may use the number of significant, i.e., non-zero, transform coefficients (in some examples, the absolute sum of the transform coefficients) to determine a context for context-based entropy decoding the mts_idx value. The mts_idx value may correspond to one of the number of MTS candidates. Video decoder 300 may then inverse transform the transform block using the indicated MTS candidate (408). The inverse transform of the transform block may yield a residual block. Video decoder 300 may then use the residual block to decode the current block of video data, e.g., by adding samples of a prediction block to corresponding samples of the residual block.

In this manner, the method of FIG. 10 represents an example of a method of decoding video data including determining a number of multiple transform selection (MTS) candidates for a current block of video data, the number being greater than zero and different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Various examples of the techniques are summarized in the following clauses:

Clause 1: A method of decoding video data, the method comprising: determining a number of multiple transform selection (MTS) candidates for a current block of video data, the number being different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Clause 2: The method of clause 1, wherein determining the number of MTS candidates comprises determining the number of MTS candidates according to a last scan position value for the transform block, the last scan position value representing a position of a last non-zero transform coefficient in scan order in the transform block.

Clause 3: The method of clause 2, wherein determining the number of MTS candidates according to the last scan position value comprises: determining mappings from ranges of possible last scan position values to corresponding numbers of MTS candidates; determining one of the ranges including the last scan position value; and determining the number of MTS candidates to which the one of the ranges including the last scan position value is mapped according to the mappings.

Clause 4: The method of clause 3, wherein a first one of the ranges is mapped to a first set of MTS candidates having a first size, and wherein a second one of the ranges is mapped to a second set of MTS candidates having a second size, the second set of MTS candidates being a subset of the first set of MTS candidates, and the second size being smaller than the first size.

Clause 5: The method of any of clauses 1-4, wherein determining the number of MTS candidates comprises determining that the number of MTS candidates other than the DCT2 candidate is equal to one, and wherein determining the one of the MTS candidates comprises determining the one of the MTS candidates without coding an MTS index value.

Clause 6: The method of any of clauses 1-4, further comprising coding an MTS index value corresponding to the one of the MTS candidates.

Clause 7: The method of clause 6, wherein coding the MTS index value comprises: coding a value for a first bin of the MTS index value indicating that the DCT2 candidate; and coding values for one or more bins of the MTS index value beyond the first bin corresponding to the one of the MTS candidates of the number of MTS candidates.

Clause 8: The method of any of clauses 6 and 7, wherein coding the MTS index value comprises coding a truncated binary codeword representing the MTS index value.

Clause 9: The method of any of clauses 6 and 7, wherein coding the MTS index value comprises coding a truncated unary codeword representing the MTS index value.

Clause 10: The method of any of clauses 6 and 7, wherein coding the MTS index value comprises coding an exponential Golomb codeword representing the MTS index value.

Clause 11: The method of any of clauses 6 and 7, wherein coding the MTS index value comprises coding a variable length codeword representing the MTS index value.

Clause 12: The method of any of clauses 6-11, wherein coding the MTS index value comprises context coding the MTS index value.

Clause 13: The method of clause 12, further comprising determining a context for context coding the MTS index value according to the number of MTS candidates.

Clause 14: The method of any of clauses 6-11, wherein coding the MTS index value comprises bypass coding the MTS index value.

Clause 15: A method of decoding video data, the method comprising: determining a predicted multi hypothesis transform (MTS) index according to a discontinuity measure across a block boundary for a current block of video data; determining a predicted sign for coefficients of at transform block of the current block according to the discontinuity measure; determining an actual MTS index based on the predicted MTS index; decoding the transform block using the predicted sign; inverse transforming the transform block to produce a residual block for the current block; and decoding the current block using the residual block.

Clause 16: A method comprising a combination of the method of any of clauses 1-14 and the method of clause 15.

Clause 17: The method of any of clauses 15 and 16, further comprising coding actual sign values for transform coefficients of the transform block using the predicted sign.

Clause 18: The method of any of clauses 15-17, wherein determining the actual MTS index comprises: determining an order for MTS index codewords for a plurality of MTS candidates according to various discontinuity measures; and coding one of the MTS index codewords corresponding to the actual MTS index.

Clause 19: A method of decoding video data, the method comprising: determining a number of multiple transform selection (MTS) candidates for a current block of video data, the number being different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Clause 20: The method of clause 19, wherein determining the number of MTS candidates comprises determining the number of MTS candidates according to a last scan position value for the transform block, the last scan position value representing a position of a last non-zero transform coefficient in scan order in the transform block.

Clause 21: The method of clause 20, wherein determining the number of MTS candidates according to the last scan position value comprises: determining mappings from ranges of possible last scan position values to corresponding numbers of MTS candidates; determining one of the ranges including the last scan position value; and determining the number of MTS candidates to which the one of the ranges including the last scan position value is mapped according to the mappings.

Clause 22: The method of clause 21, wherein a first one of the ranges is mapped to a first set of MTS candidates having a first size, and wherein a second one of the ranges is mapped to a second set of MTS candidates having a second size, the second set of MTS candidates being a subset of the first set of MTS candidates, and the second size being smaller than the first size.

Clause 23: The method of clause 19, wherein determining the number of MTS candidates comprises determining that the number of MTS candidates other than the DCT2 candidate is equal to one, and wherein determining the one of the MTS candidates comprises determining the one of the MTS candidates without coding an MTS index value.

Clause 24: The method of clause 19, further comprising coding an MTS index value corresponding to the one of the MTS candidates.

Clause 25: The method of clause 24, wherein coding the MTS index value comprises: coding a value for a first bin of the MTS index value indicating that the DCT2 candidate; and coding values for one or more bins of the MTS index value beyond the first bin corresponding to the one of the MTS candidates of the number of MTS candidates.

Clause 26: The method of clause 24, wherein coding the MTS index value comprises coding a truncated binary codeword representing the MTS index value.

Clause 27: The method of clause 24, wherein coding the MTS index value comprises coding a truncated unary codeword representing the MTS index value.

Clause 28: The method of clause 24, wherein coding the MTS index value comprises coding an exponential Golomb codeword representing the MTS index value.

Clause 29: The method of clause 24, wherein coding the MTS index value comprises coding a variable length codeword representing the MTS index value.

Clause 30: The method of clause 24, wherein coding the MTS index value comprises context coding the MTS index value.

Clause 31: The method of clause 30, further comprising determining a context for context coding the MTS index value according to the number of MTS candidates.

Clause 32: The method of clause 24, wherein coding the MTS index value comprises bypass coding the MTS index value.

Clause 33: A method of decoding video data, the method comprising: determining a predicted multi hypothesis transform (MTS) index according to a discontinuity measure across a block boundary for a current block of video data;

determining a predicted sign for coefficients of at transform block of the current block according to the discontinuity measure; determining an actual MTS index based on the predicted MTS index; decoding the transform block using the predicted sign; inverse transforming the transform block to produce a residual block for the current block; and decoding the current block using the residual block.

Clause 34: The method of clause 33, further comprising coding actual sign values for transform coefficients of the transform block using the predicted sign.

Clause 35: The method of clause 33, wherein determining the actual MTS index comprises: determining an order for MTS index codewords for a plurality of MTS candidates according to various discontinuity measures; and coding one of the MTS index codewords corresponding to the actual MTS index.

Clause 36: The method of clause 33, further comprising encoding the current block prior to decoding the current block.

Clause 37: A device for decoding video data, the device comprising one or more means for performing the method of any of clauses 1-36.

Clause 38: The device of clause 37, further comprising a display configured to display the decoded video data.

Clause 39: The device of any of clauses 37 and 38, wherein the device comprises one or more of a camera, a computer, a mobile device, a broadcast receiver device, or a set-top box.

Clause 40: The device of clause 37-39, further comprising a memory configured to store the video data.

Clause 41: A computer-readable storage medium having stored thereon instructions that, when executed, cause a processor of a device for decoding video data to perform the method of any of clauses 1-36.

Clause 42: A device for decoding video data, the device comprising: means for determining a number of multiple transform selection (MTS) candidates for a current block of video data, the number being different than four, the MTS candidates being MTS candidates other than a DCT2 candidate; means for determining one of the MTS candidates of the number of MTS candidates for the current block; means for inverse transforming a transform block for the current block using the determined one of the MTS candidates to produce a residual block; and means for decoding the current block using the residual block.

Clause 43: A device for decoding video data, the device comprising: means for determining a predicted multi hypothesis transform (MTS) index according to a discontinuity measure across a block boundary for a current block of video data; means for determining a predicted sign for coefficients of at transform block of the current block according to the discontinuity measure; means for determining an actual MTS index based on the predicted MTS index; means for decoding the transform block using the predicted sign; means for inverse transforming the transform block to produce a residual block for the current block; and means for decoding the current block using the residual block.

Clause 44: A method of decoding video data, the method comprising: determining a number of multiple transform selection (MTS) candidates for a current block of video data, the number being greater than zero and different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Clause 45: The method of clause 44, wherein determining the number of MTS candidates comprises determining the number of MTS candidates according to a number of non-zero coefficients of the transform block.

Clause 46: The method of clause 45, wherein determining the number of MTS candidates comprises determining the number of MTS candidates according to a comparison of the number of non-zero coefficients to one or more threshold values.

Clause 47: The method of clause 45, wherein determining the number of MTS candidates comprises: calculating an absolute sum of the non-zero coefficients of the transform block; and determining the number of MTS candidates according to the absolute sum of the non-zero coefficients of the transform block.

Clause 48: The method of clause 44, wherein determining the number of MTS candidates comprises determining the number of MTS candidates according to a last scan position value for the transform block, the last scan position value representing a position of a last non-zero transform coefficient in scan order in the transform block.

Clause 49: The method of clause 48, wherein determining the number of MTS candidates according to the last scan position value comprises: determining mappings from ranges of possible last scan position values to corresponding numbers of MTS candidates; determining one of the ranges including the last scan position value; and determining the number of MTS candidates to which the one of the ranges including the last scan position value is mapped according to the mappings.

Clause 50: The method of clause 49, wherein a first one of the ranges is mapped to a first set of MTS candidates having a first size, and wherein a second one of the ranges is mapped to a second set of MTS candidates having a second size, the second set of MTS candidates being a subset of the first set of MTS candidates, and the second size being smaller than the first size.

Clause 51: The method of clause 44, wherein determining the number of MTS candidates comprises determining that the number of MTS candidates other than the DCT2 candidate is equal to one, and wherein determining the one of the MTS candidates comprises determining the one of the MTS candidates without coding an MTS index value.

Clause 52: The method of clause 44, further comprising coding an MTS index value corresponding to the one of the MTS candidates.

Clause 53: The method of clause 52, wherein coding the MTS index value comprises: coding a value for a first bin of the MTS index value indicating that the DCT2 candidate; and coding values for one or more bins of the MTS index value beyond the first bin corresponding to the one of the MTS candidates of the number of MTS candidates.

Clause 54: The method of clause 52, wherein coding the MTS index value comprises coding one of a truncated binary codeword representing the MTS index value, a truncated unary codeword representing the MTS index value, an exponential Golomb codeword representing the MTS index value, or a variable length codeword representing the MTS index value.

Clause 55: The method of clause 52, wherein coding the MTS index value comprises: determining a context for context coding the MTS index value according to the number of MTS candidates; and context coding the MTS index value using the determined context.

Clause 56: The method of clause 52, wherein coding the MTS index value comprises: determining a predicted MTS index value according to a discontinuity measure across a block boundary for the current block; and determining the MTS index based on the predicted MTS index.

Clause 57: The method of clause 56, further comprising: determining a predicted sign for transform coefficients of the transform block according to the discontinuity measure; and decoding the transform coefficients using the predicted sign.

Clause 58: The method of clause 56, further comprising coding actual sign values for transform coefficients of the transform block using the predicted sign.

Clause 59: The method of clause 52, wherein coding the MTS index comprises: determining an order for MTS index codewords for the MTS candidates according to various discontinuity measures across one or more block boundaries for the current block; and coding one of the MTS index codewords corresponding to the MTS index.

Clause 60: The method of clause 1, further comprising encoding the current block prior to decoding the current block.

Clause 61: A device for decoding video data, the device comprising: a memory configured to store video data; and one or more processors implemented in circuitry and configured to: determine a number of multiple transform selection (MTS) candidates for a current block of video data, the number being greater than zero and different than four, the MTS candidates being MTS candidates other than a DCT2 candidate; determine one of the MTS candidates of the number of MTS candidates for the current block; inverse transform a transform block for the current block using the determined one of the MTS candidates to produce a residual block; and decode the current block using the residual block.

Clause 62: The device of clause 61, wherein the one or more processors are configured to determine the number of MTS candidates according to a number of non-zero coefficients of the transform block.

Clause 63: The device of clause 62, wherein the one or more processors are configured to determine the number of MTS candidates according to a comparison of the number of non-zero coefficients to one or more threshold values.

Clause 64: The device of clause 62, wherein to determine the number of MTS candidates, the one or more processors are configured to: calculate an absolute sum of the non-zero coefficients of the transform block; and determine the number of MTS candidates according to the absolute sum of the non-zero coefficients of the transform block.

Clause 65: The device of clause 61, wherein the one or more processors are configured to determine the number of MTS candidates according to a last scan position value for the transform block, the last scan position value representing a position of a last non-zero transform coefficient in scan order in the transform block.

Clause 66: The device of clause 61, wherein the one or more processors are further configured to code an MTS index value corresponding to the one of the MTS candidates.

Clause 67: The device of clause 66, wherein to code the MTS index value, the one or more processors are configured to: code a value for a first bin of the MTS index value indicating that the DCT2 candidate; and code values for one or more bins of the MTS index value beyond the first bin corresponding to the one of the MTS candidates of the number of MTS candidates.

Clause 68: The device of clause 66, wherein to code the MTS index value, the one or more processors are configured to code one of a truncated binary codeword representing the MTS index value, a truncated unary codeword representing the MTS index value, an exponential Golomb codeword representing the MTS index value, or a variable length codeword representing the MTS index value.

Clause 69: The device of clause 66, wherein to code the MTS index value, the one or more processors are configured to: determine a context for context coding the MTS index value according to the number of MTS candidates; and context code the MTS index value using the determined context.

Clause 70: The device of clause 66, wherein to code the MTS index value, the one or more processors are configured to: determine a predicted MTS index value according to a discontinuity measure across a block boundary for the current block; and determine the MTS index based on the predicted MTS index.

Clause 71: The device of clause 66, wherein to code the MTS index value, the one or more processors are configured to: determine an order for MTS index codewords for the MTS candidates according to various discontinuity measures across one or more block boundaries for the current block; and code one of the MTS index codewords corresponding to the MTS index.

Clause 72: The device of clause 61, wherein the one or more processors are further configured to encode the current block prior to decoding the current block.

Clause 73: A device for decoding video data, the device comprising: means for determining a number of multiple transform selection (MTS) candidates for a current block of video data, the number being greater than zero and different than four, the MTS candidates being MTS candidates other than a DCT2 candidate; means for determining one of the MTS candidates of the number of MTS candidates for the current block; means for inverse transforming a transform block for the current block using the determined one of the MTS candidates to produce a residual block; and means for decoding the current block using the residual block.

Clause 74: The device of clause 73, wherein the means for determining the number of MTS candidates comprises means for determining the number of MTS candidates according to a number of non-zero coefficients of the transform block.

Clause 75: The device of clause 74, wherein the means for determining the number of MTS candidates comprises means for determining the number of MTS candidates according to a comparison of the number of non-zero coefficients to one or more threshold values.

Clause 76: The device of clause 74, wherein the means for determining the number of MTS candidates comprises: means for calculating an absolute sum of the non-zero coefficients of the transform block; and means for determining the number of MTS candidates according to the absolute sum of the non-zero coefficients of the transform block.

Clause 77: A method of decoding video data, the method comprising: determining a number of multiple transform selection (MTS) candidates for a current block of video data, the number being greater than zero and different than four, the MTS candidates being MTS candidates other than a DCT2 candidate; determining one of the MTS candidates of the number of MTS candidates for the current block; inverse transforming a transform block for the current block using the determined one of the MTS candidates to produce a residual block; and decoding the current block using the residual block.

Clause 78: The method of clause 77, wherein determining the number of MTS candidates comprises determining the number of MTS candidates according to a number of non-zero coefficients of the transform block.

Clause 79: The method of clause 78, wherein determining the number of MTS candidates comprises determining the number of MTS candidates according to a comparison of the number of non-zero coefficients to one or more threshold values.

Clause 80: The method of any of clauses 78 and 79, wherein determining the number of MTS candidates comprises: calculating an absolute sum of the non-zero coefficients of the transform block; and determining the number of MTS candidates according to the absolute sum of the non-zero coefficients of the transform block.

Clause 81: The method of any of clauses 78-80, wherein determining the number of MTS candidates comprises determining the number of MTS candidates according to a last scan position value for the transform block, the last scan position value representing a position of a last non-zero transform coefficient in scan order in the transform block.

Clause 82: The method of clause 81, wherein determining the number of MTS candidates according to the last scan position value comprises: determining mappings from ranges of possible last scan position values to corresponding numbers of MTS candidates; determining one of the ranges including the last scan position value; and determining the number of MTS candidates to which the one of the ranges including the last scan position value is mapped according to the mappings.

Clause 83: The method of clause 82, wherein a first one of the ranges is mapped to a first set of MTS candidates having a first size, and wherein a second one of the ranges is mapped to a second set of MTS candidates having a second size, the second set of MTS candidates being a subset of the first set of MTS candidates, and the second size being smaller than the first size.

Clause 84: The method of any of clauses 77-83, wherein determining the number of MTS candidates comprises determining that the number of MTS candidates other than the DCT2 candidate is equal to one, and wherein determining the one of the MTS candidates comprises determining the one of the MTS candidates without coding an MTS index value.

Clause 85: The method of any of clauses 77-84, further comprising coding an MTS index value corresponding to the one of the MTS candidates.

Clause 86: The method of clause 85, wherein coding the MTS index value comprises: coding a value for a first bin of the MTS index value indicating that the DCT2 candidate; and coding values for one or more bins of the MTS index value beyond the first bin corresponding to the one of the MTS candidates of the number of MTS candidates.

Clause 87: The method of any of clauses 85 and 86, wherein coding the MTS index value comprises coding one of a truncated binary codeword representing the MTS index value, a truncated unary codeword representing the MTS index value, an exponential Golomb codeword representing the MTS index value, or a variable length codeword representing the MTS index value.

Clause 88: The method of any of clauses 85-87, wherein coding the MTS index value comprises: determining a context for context coding the MTS index value according to the number of MTS candidates; and context coding the MTS index value using the determined context.

Clause 89: The method of any of clauses 85-88, wherein coding the MTS index value comprises: determining a predicted MTS index value according to a discontinuity measure across a block boundary for the current block; and determining the MTS index based on the predicted MTS index.

Clause 90: The method of clause 89, further comprising: determining a predicted sign for transform coefficients of the transform block according to the discontinuity measure; and decoding the transform coefficients using the predicted sign.

Clause 91: The method of any of clauses 89 and 90, further comprising coding actual sign values for transform coefficients of the transform block using the predicted sign.

Clause 92: The method of any of clauses 85-91, wherein coding the MTS index comprises: determining an order for MTS index codewords for the MTS candidates according to various discontinuity measures across one or more block boundaries for the current block; and coding one of the MTS index codewords corresponding to the MTS index.

Clause 93: The method of any of clauses 77-92, further comprising encoding the current block prior to decoding the current block.

Clause 94: A device for decoding video data, the device comprising: a memory configured to store video data; and one or more processors implemented in circuitry and configured to: determine a number of multiple transform selection (MTS) candidates for a current block of video data, the number being greater than zero and different than four, the MTS candidates being MTS candidates other than a DCT2 candidate; determine one of the MTS candidates of the number of MTS candidates for the current block; inverse transform a transform block for the current block using the determined one of the MTS candidates to produce a residual block; and decode the current block using the residual block.

Clause 95: The device of clause 94, wherein the one or more processors are configured to determine the number of MTS candidates according to a number of non-zero coefficients of the transform block.

Clause 96: The device of clause 95, wherein the one or more processors are configured to determine the number of MTS candidates according to a comparison of the number of non-zero coefficients to one or more threshold values.

Clause 97: The device of any of clauses 95 and 96, wherein to determine the number of MTS candidates, the one or more processors are configured to: calculate an absolute sum of the non-zero coefficients of the transform block; and determine the number of MTS candidates according to the absolute sum of the non-zero coefficients of the transform block.

Clause 98: The device of any of clauses 95-97, wherein the one or more processors are configured to determine the number of MTS candidates according to a last scan position value for the transform block, the last scan position value representing a position of a last non-zero transform coefficient in scan order in the transform block.

Clause 99: The device of any of clauses 95-98, wherein the one or more processors are further configured to code an MTS index value corresponding to the one of the MTS candidates.

Clause 100: The device of clause 99, wherein to code the MTS index value, the one or more processors are configured to: code a value for a first bin of the MTS index value indicating that the DCT2 candidate; and code values for one or more bins of the MTS index value beyond the first bin corresponding to the one of the MTS candidates of the number of MTS candidates.

Clause 101: The device of any of clauses 99 and 100, wherein to code the MTS index value, the one or more processors are configured to code one of a truncated binary codeword representing the MTS index value, a truncated unary codeword representing the MTS index value, an exponential Golomb codeword representing the MTS index value, or a variable length codeword representing the MTS index value.

Clause 102: The device of any of clauses 99-101, wherein to code the MTS index value, the one or more processors are configured to: determine a context for context coding the MTS index value according to the number of MTS candidates; and context code the MTS index value using the determined context.

Clause 103: The device of any of clauses 99-102, wherein to code the MTS index value, the one or more processors are configured to: determine a predicted MTS index value according to a discontinuity measure across a block boundary for the current block; and determine the MTS index based on the predicted MTS index.

Clause 104: The device of any of clauses 99-103, wherein to code the MTS index value, the one or more processors are configured to: determine an order for MTS index codewords for the MTS candidates according to various discontinuity measures across one or more block boundaries for the current block; and code one of the MTS index codewords corresponding to the MTS index.

Clause 105: The device of any of clauses 94-104, wherein the one or more processors are further configured to encode the current block prior to decoding the current block.

Clause 106: A device for decoding video data, the device comprising: means for determining a number of multiple transform selection (MTS) candidates for a current block of video data, the number being greater than zero and different than four, the MTS candidates being MTS candidates other than a DCT2 candidate; means for determining one of the MTS candidates of the number of MTS candidates for the current block; means for inverse transforming a transform block for the current block using the determined one of the MTS candidates to produce a residual block; and means for decoding the current block using the residual block.

Clause 107: The device of clause 106, wherein the means for determining the number of MTS candidates comprises means for determining the number of MTS candidates according to a number of non-zero coefficients of the transform block.

Clause 108: The device of clause 107, wherein the means for determining the number of MTS candidates comprises means for determining the number of MTS candidates according to a comparison of the number of non-zero coefficients to one or more threshold values.

Clause 109: The device of any of clauses 107 and 108, wherein the means for determining the number of MTS candidates comprises: means for calculating an absolute sum of the non-zero coefficients of the transform block; and means for determining the number of MTS candidates according to the absolute sum of the non-zero coefficients of the transform block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a set of multiple transform selection (MTS) candidates for a current block of video data,
    wherein determining the set comprises selecting the set, based on a number of non-zero coefficients of a transform block, between
        a first set consisting of a single MTS candidate,
        a second set of MTS candidates having at least four MTS candidates, and
        a third set of MTS candidates having more MTS candidates than the second set, the MTS candidates of the second and third set being MTS candidates other than a DCT2 candidate;
    determining one of the MTS candidates of the determined set of MTS candidates for the current block;
    inverse transforming the transform block for the current block using the determined one of the MTS candidates to produce a residual block; and
    decoding the current block using the residual block.

2. The method of claim 1, wherein determining the number of MTS candidates comprises selecting the set of MTS candidates according to a comparison of the number of non-zero coefficients to one or more threshold values.

3. The method of claim 1, wherein selecting the set of MTS candidates comprises:
    calculating an absolute sum of the non-zero coefficients of the transform block; and
    determining the number of MTS candidates according to the absolute sum of the non-zero coefficients of the transform block.

4. The method of claim 1, wherein selecting the set of MTS candidates comprises determining the set of MTS candidates according to a last scan position value for the transform block, the last scan position value representing a position of a last non-zero transform coefficient in scan order in the transform block.

5. The method of claim 4, wherein selecting the set of MTS candidates according to the last scan position value comprises:
    determining mappings from ranges of possible last scan position values to corresponding numbers of MTS candidates;
    determining one of the ranges including the last scan position value; and
    selecting the set of MTS candidates to which the one of the ranges including the last scan position value is mapped according to the mappings.

6. The method of claim 5, wherein a first one of the ranges is mapped to the third set of MTS candidates having a first size, and wherein a second one of the ranges is mapped to a second set of MTS candidates having a second size, the second set of MTS candidates being a subset of the third set of MTS candidates, and the second size being smaller than the first size.

7. The method of claim 1, further comprising coding an MTS index value corresponding to the one of the MTS candidates.

8. The method of claim 7, wherein coding the MTS index value comprises:
    coding a value for a first bin of the MTS index value indicating that the DCT2 candidate is not used; and
    coding values for one or more bins of the MTS index value beyond the first bin corresponding to the one of the MTS candidates of the determined set of MTS candidates.

9. The method of claim 7, wherein coding the MTS index value comprises coding one of a truncated binary codeword representing the MTS index value, a truncated unary codeword representing the MTS index value, an exponential Golomb codeword representing the MTS index value, or a variable length codeword representing the MTS index value.

10. The method of claim 7, wherein coding the MTS index value comprises:
    determining a context for context coding the MTS index value according to the set of MTS candidates; and
    context coding the MTS index value using the determined context.

11. The method of claim 7, wherein coding the MTS index value comprises:
    determining a predicted MTS index value according to a discontinuity measure across a block boundary for the current block; and
    determining the MTS index based on the predicted MTS index.

12. The method of claim 11, further comprising:
    determining a predicted sign for transform coefficients of the transform block according to the discontinuity measure; and
    decoding the transform coefficients using the predicted sign.

13. The method of claim 11, further comprising coding actual sign values for transform coefficients of the transform block using the predicted sign.

14. The method of claim 7, wherein coding the MTS index comprises:
    determining an order for MTS index codewords for the MTS candidates according to various discontinuity measures across one or more block boundaries for the current block; and
    coding one of the MTS index codewords corresponding to the MTS index.

15. The method of claim 1, further comprising encoding the current block prior to decoding the current block.

16. A device for decoding video data, the device comprising:
    a memory configured to store video data; and
    one or more processors implemented in circuitry and configured to:
        determine a set of multiple transform selection (MTS) candidates for a current block of video data,
        wherein to determine the set, the one or more processors is configured to select the set, based on a number of non-zero coefficients of a transform block, between a first set consisting of a single MTS candidate, a second set of MTS candidates having at least four MTS candidates, and a third set of MTS candidates having more MTS candidates than the second set, the MTS candidates of the second and third set being MTS candidates other than a DCT2 candidate;
        determine one of the MTS candidates of the determined set of MTS candidates for the current block;
        inverse transform the transform block for the current block using the determined one of the MTS candidates to produce a residual block; and
        decode the current block using the residual block.

17. The device of claim 16, wherein the one or more processors are configured to select the set of MTS candidates according to a comparison of the number of non-zero coefficients to one or more threshold values.

18. The device of claim 16, wherein to determine select the set of MTS candidates, the one or more processors are configured to:
calculate an absolute sum of the non-zero coefficients of the transform block; and
select the set of MTS candidates according to the absolute sum of the non-zero coefficients of the transform block.

19. The device of claim 16, wherein the one or more processors are configured to select the set of MTS candidates according to a last scan position value for the transform block, the last scan position value representing a position of a last non-zero transform coefficient in scan order in the transform block.

20. The device of claim 16, wherein the one or more processors are further configured to code an MTS index value corresponding to the one of the MTS candidates.

21. The device of claim 20, wherein to code the MTS index value, the one or more processors are configured to:
code a value for a first bin of the MTS index value indicating that the DCT2 candidate is not used; and
code values for one or more bins of the MTS index value beyond the first bin corresponding to the one of the MTS candidates of the determined set of MTS candidates.

22. The device of claim 20, wherein to code the MTS index value, the one or more processors are configured to code one of a truncated binary codeword representing the MTS index value, a truncated unary codeword representing the MTS index value, an exponential Golomb codeword representing the MTS index value, or a variable length codeword representing the MTS index value.

23. The device of claim 20, wherein to code the MTS index value, the one or more processors are configured to:
determine a context for context coding the MTS index value according to the set of MTS candidates; and
context code the MTS index value using the determined context.

24. The device of claim 20, wherein to code the MTS index value, the one or more processors are configured to:
determine a predicted MTS index value according to a discontinuity measure across a block boundary for the current block; and
determine the MTS index based on the predicted MTS index.

25. The device of claim 20, wherein to code the MTS index value, the one or more processors are configured to:
determine an order for MTS index codewords for the MTS candidates according to various discontinuity measures across one or more block boundaries for the current block; and
code one of the MTS index codewords corresponding to the MTS index.

26. The device of claim 16, wherein the one or more processors are further configured to encode the current block prior to decoding the current block.

27. A device for decoding video data, the device comprising:
means for determining a set of multiple transform selection (MTS) candidates for a current block of video data, wherein the means for determining the set comprises means for selecting the set, based on a number of non-zero coefficients of a transform block, between a first set consisting of a single MTS candidate, a second set of MTS candidates having at least four MTS candidates, and
a third set of MTS candidates having more MTS candidates than the second set, the MTS candidates of the second and third set being MTS candidates other than a DCT2 candidate;
means for determining one of the MTS candidates of the determined set number of MTS candidates for the current block;
means for inverse transforming the transform block for the current block using the determined one of the MTS candidates to produce a residual block; and
means for decoding the current block using the residual block.

28. The method of claim 1, wherein the third set of MTS candidates has at least six candidates.

29. The device of claim 16, wherein the third set of MTS candidates has at least six candidates.

* * * * *